United States Patent
Spadoni et al.

(10) Patent No.: US 6,440,926 B1
(45) Date of Patent: Aug. 27, 2002

(54) EFFERVESCENT COMPOSITIONS AND DRY EFFERVESCENT GRANULES

(75) Inventors: Luca Spadoni, Rome; Roberto Morelli, Latino Scalo, both of (IT); Sylvestre Canceil, Newcastle-Upon-Tyne; Richard Timothy Hartshorn, Wylam, both of (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/402,973

(22) PCT Filed: Apr. 14, 1998

(86) PCT No.: PCT/IB98/00562

§ 371 (c)(1),
(2), (4) Date: Oct. 14, 1999

(87) PCT Pub. No.: WO98/46716

PCT Pub. Date: Oct. 22, 1998

(30) Foreign Application Priority Data

Apr. 14, 1997 (EP) .............................. 97870048

(51) Int. Cl.[7] .......................... C11D 17/06; C11D 3/10; C11D 3/20
(52) U.S. Cl. ................... 510/445; 510/276; 510/283; 510/302; 510/444; 510/446; 510/451; 510/473; 510/475; 510/477; 510/488; 510/498; 510/506; 510/509
(58) Field of Search ................ 510/445, 276, 510/451, 283, 475, 302, 444, 477, 446, 488, 473, 509, 506, 498

(56) References Cited

U.S. PATENT DOCUMENTS

| | | | | |
|---|---|---|---|---|
| 3,601,321 A | * | 8/1971 | Barth et al. ...................... 241/3 |
| 4,155,868 A | * | 5/1979 | Kaplan et al. ............... 510/117 |
| 4,252,664 A | * | 2/1981 | Inamorato ................... 510/319 |
| 4,365,853 A | * | 12/1982 | Ehrlich ......................... 312/42 |
| 4,853,211 A | * | 8/1989 | Kurobe et al. ................. 424/44 |
| 5,223,246 A | * | 6/1993 | Kondo et al. .................. 424/44 |
| 5,332,519 A | * | 7/1994 | Mazzola ...................... 510/351 |
| 5,388,754 A | * | 2/1995 | Grosclaude et al. ......... 228/118 |
| 5,578,562 A | * | 11/1996 | Lockhart ..................... 510/446 |
| 5,630,883 A | * | 5/1997 | Steer et al. .............. 134/22.13 |
| 5,720,793 A | * | 2/1998 | Kato et al. ...................... 71/16 |
| 5,741,520 A | * | 4/1998 | Desenna ...................... 424/466 |
| 5,814,337 A | * | 9/1998 | Merrifield et al. .......... 421/466 |
| 5,846,564 A | * | 12/1998 | Besse .......................... 424/466 |
| 6,191,100 B1 | * | 2/2001 | Askew et al. ................ 510/504 |
| 6,274,156 B1 | * | 8/2001 | Croze et al. ................. 424/405 |

FOREIGN PATENT DOCUMENTS

| | | | |
|---|---|---|---|
| EP | 0110588 A1 | * | 6/1984 |
| EP | 0133354 | * | 2/1985 |
| EP | 0661000 A1 | * | 7/1995 |
| GB | 1527010 A | * | 10/1978 |
| GB | 2157705 | * | 10/1985 |
| JP | 07187998 | * | 7/1995 |
| WO | WO-95/20030 A1 | * | 7/1995 |
| WO | WO-96/02621 A1 | * | 2/1996 |
| WO | WO-97/02014 A1 | * | 1/1997 |
| WO | 97/03111 | * | 1/1997 |
| WO | WO 97/43366 | | 11/1997 |
| WO | WO-98/04667 A1 | * | 1/1998 |

* cited by examiner

Primary Examiner—Lorna M. Douyon
(74) Attorney, Agent, or Firm—Julia A. Glazer; Marianne Dressman; Kim William Zerby

(57) ABSTRACT

The present invention discloses dry effervescent granules comprising an acid, carbonate source and optionally a binder, wherein said acid, carbonate source and optionally binder are in close physical proximity. The invention also discloses granular compositions, containing effervescence material comprising an acid and a carbonate source, which has an effervescence index (EI) of at least 50. The granular compositions may be obtainable by incorporating said preformed dry effervescent granules into said granular compositions, especially detergent compositions. Improved effervescence is obtained when diluting these granular detergent compositions with water to obtain a washing/soaking liquor, resulting thereby in improved dissolution/dispensing characteristic and improved stain removal performance on soiled fabrics.

14 Claims, No Drawings

EFFERVESCENT COMPOSITIONS AND DRY EFFERVESCENT GRANULES

TECHNICAL FIELD

The present invention is applicable to compositions which need to be dissolved in an aqueous medium in an easy and fast way. This technology may found application in various fields, e.g., in detergent compositions like laundry detergent compositions, soaking detergent compositions, dishwashing compositions or any other compositions for household applications, in pharmaceutical preparations, dental preparations, food and the like. More particularly, the present invention relates to granular detergent compositions intended for the cleaning of fabrics.

BACKGROUND OF THE INVENTION

A problem associated to conventional granular compositions which are to be used by the consumer after having been diluted typically with water, is their tendency towards poor dissolution. That tendency has been exacerbated by the recent trend in for example the detergent industry towards higher bulk density granular compositions and towards granular detergent compositions which have a higher content of active ingredients. Granular detergent compositions of high bulk densities ranging from 650 to 1100 kg/m3 are attractive to consumers but not satisfactorily dissolved into an aqueous medium.

Another difficulty with detergent compositions is that they are not easily flushed from the dispenser drawer of a washing machine. Similar problems are encountered when using such granular detergent compositions in a dosing device in the washing drum.

It is known to use citric acid and bicarbonate in powder compositions to promote dissolution of for example pharmaceutical preparations. In order to ensure an uniform distribution of these effervescent materials in these preparations it is essential to utilise sodium bicarbonate and citric acid in the form of fine powders. It is also necessary to incorporate considerable proportions of these effervescent materials in the preparations in order to obtain the desired effect. Furthermore, a major issue with such powder compositions is the poor storage stability when they are exposed to moisture.

It is thus an object of the present invention to provide compositions with improved dissolution and/or dispensing characteristics upon dilution in an aqueous medium. It is a further object of the present invention that the effective dissolution characteristics of the compositions of the present invention are not reduced or lost during storage.

It has now been found that these objects can be met by providing a detergent composition comprising effervescence material containing an acid and a carbonate source having a specific effervescence index. Preferably, the effervescence material or at least part thereof, is comprised in a dry effervescence granule. In particular, it has been found that the objectives can thus be met by providing a granular composition obtainable by a process which comprises the step of first forming a dry effervescent granule comprising an acid, carbonate and/or bicarbonate and optionally a binder wherein the acid, carbonate and/or bicarbonate and the binder are in close physical proximity, then incorporating this granule in the granular composition. Indeed, it has been found that for example the incorporation of such pre-formed dry effervescent granules typically obtainable by dry-powder compaction or pressure agglomeration into the compositions according to the present invention provides improved dissolution and/or dispensing characteristics to all the active ingredients present in the compositions and good storage stability in respect of the dissolution potential. It has been found that the compositions according to the present invention deliver enhanced effervescence which results in improved dissolution or dispensing of the compositions, when the compositions are contacted with water (i.e., in use conditions), as compared to compositions having the same effervescence powders present at the same levels, wherein all the effervescent materials are uniformly distributed in the whole granular compositions, i.e., are two separate granular particles.

Another problem associated to conventional detergent is their tendency of not always satisfactorily meeting consumer needs in respect to the performance delivered by the active ingredients present in said compositions.

Furthermore, when formulating bleach-containing detergent compositions, comprising an oxygen bleach, it is not only desirable to deliver effective stain removal performance (e.g., on bleachable stains), but importantly such compositions need also to be thermally stable upon prolonged storage time before their actual use.

It has now been found that these problems are solved by the detergent compositions of the invention, as described herein. Furthermore, it has been found that in a preferred embodiment of the present invention, the presence of the pre-formed dry effervescent granules, as described herein, in a detergent composition comprising an active detergent ingredient, produces enhanced effervescence upon contact with water, which results in improved dissolution and/or dispensing of the composition and improved stain removal performance observed on the fabrics treated, as compared to the stain removal performance delivered in the same conditions with compositions, having the same ingredients, at the same levels, which however comprise all the effervescent materials uniformly distributed in the whole granular compositions, or with the same compositions but being free of any effervescent materials. More particularly, it has been found that the stain removal performance is even more improved due to the presence of the dry pre-formed effervescent granules, in a detergent composition. This has also been found when the composition is used in short soaking operations, i.e. when the soiled fabrics are immersed in a soaking liquor comprising water and said composition, simultaneously or immediately after its preparation (e.g., before 5 minutes and more preferably before 1 minute after its preparation), for typically less than 30 minutes, before being removed from the soaking liquor. Advantageously, the stain removal performance improvement associated to the detergent compositions of the present invention is also even more noticeable at low usage temperatures, typically below 30° C.

Advantageously the improved stain removal performance is observed on a variety of stains including tough outdoor dirt like greasy stains (e.g. spaghetti sauce, bacon grease), enzymatic stains (blood), bleachable stains (grass) and/or particulate soils (mud/clay).

Another advantage of the present invention is that the stain removal performance, when soaking/washing a fabric in presence of a detergent composition as described herein, is improved even in the presence of relatively high levels of hardness ions.

It has now been found that compositions of the invention and the dry pre-formed effervescent granules are bleach-compatible and stable upon storage.

SUMMARY OF THE INVENTION

The present invention provides a detergent composition comprising a effervescence source, containing an acid and a carbonate source, whereby the effervescence index of the composition is at least 10, as described herein.

The present invention also encompasses a dry effervescent granule comprising an acid, a carbonate source, preferably carbonate/bicarbonate and optionally a binder, wherein said acid, carbonate source and optionally binder are in close physical proximity.

The present invention also encompasses a process of manufacturing the dry effervescent granules as described herein, wherein said process comprises the steps of:
- first mixing the acid, the carbonate source and optionally the binder together to obtain a mixture,
- then submitting the mixture to a pressure agglomeration step, as defined herein, to obtain agglomerated mixture,
- and finally submitting the agglomerated mixture to a granulation step.

The present invention also encompasses a composition obtainable by a process which comprises the step of first forming a dry effervescent granule comprising an acid, a carbonate source, preferably carbonate and/or bicarbonate and optionally a binder wherein the acid, carbonate source and optionally the binder are in close physical proximity, then incorporating this granule in said composition. In a preferred embodiment compositions are granular or solid detergent compositions comprising at least a detergent active ingredient, preferably at least an oxygen bleach or a mixture thereof.

The present invention further encompasses the use of a dry effervescent granule, as described herein, in a detergent composition, preferably solid or granular, comprising at least one detergent active ingredient, for improved stain removal performance. This may typically be, when fabrics are immersed, for an effective period of time, in a soaking liquor comprising water and an effective amount of said granular detergent composition before removing said fabrics from said soaking liquor.

The present invention further encompasses the use of a dry effervescent granule, as described herein, in a composition, preferably granular or solid, comprising an oxygen bleach, preferably percarbonate and/or perborate, for improved thermal stability of said composition upon storage.

Finally, the present invention also encompasses a process of soaking fabrics, wherein said fabrics are immersed in a soaking liquor comprising water and an effective amount of a composition as described herein, for an effective period of time, then removed from said soaking liquor and also encompasses a process of washing fabrics in a domestic washing machine comprising, introducing into a dispensing device which is placed in the drum of the washing machine, or introducing into the dispensing drawer of a washing machine, an effective amount of a detergent composition as described herein.

DETAILED DESCRIPTION OF THE INVENTION

The Dry Effervescent Granule and Process for its Manufacturing

The present invention encompasses a dry effervescent granule comprising an acid, carbonate source, preferably carbonate and/or bicarbonate, and optionally a binder wherein the acid, carbonate source and optionally the binder are in close physical proximity and a process for manufacturing the same.

By "dry" it is to be understood that the granules are substantially free of water, i.e., that no water has been added or present other than the moisture of the raw materials themselves. Typically, the level of water is below 5% by weight of the total granule, preferably below 3% and more preferably below 1.5%.

For the purpose of the present invention, the term close physical proximity means that the effervescent materials, i.e., the acid, and carbonate source, are in intimate admixture in the effervescent granules and may not be separated by anything else than a binder, if the binder is present in the dry effervescent granule. Preferably, according to the present invention, at least part of the acid and the carbonate are not separate discrete particles in the granular compositions.

The dry effervescent granules according to the present invention comprising the effervescent materials, i.e., the acid and the carbonate source, in close physical proximity are preferably obtainable by dry-powder compaction or pressure agglomeration. While all binding mechanisms can occur in pressure agglomeration, adhesion forces between the solid particles, i.e., between the acid, carbonate source and optionally the binder if present, play an especially important role. This is because pressure agglomeration, especially high pressure agglomeration, is an essentially dry process that forms new entities (i.e., dry effervescent granules) from solid particles (i.e., the acid, bicarbonate, carbonate source and optionally the binder) by applying external forces to densify a more or less defined bulk mass or volume and create binding mechanisms between the solid particles providing strength to the new entity, i.e. the high external force applied brings the solid particles closely together.

The dry effervescent particles results in a very fast carbon dioxide production and therefore in accelerated dispersibility and dissolution rate of the granular composition. The granular compositions of the present invention, as described herein, comprising the dry effervescent granules allow dispensing and dissolution in water of the granular compositions in a shorter period of time and at lower total level of effervescent particles/materials and ensure a faster and more effective delivery of detergent ingredients to the wash.

Suitable acids to be used herein include solid organic, mineral or inorganic acids, salts or derivatives thereof or a mixture thereof. It may be preferred that the acids are mono-, bi- or tri-protonic acids. Such acids include mono- or polycarboxylic acids preferably citric acid, adipic acid, glutaric acid, 3 chetoglutaric acid, citramalic acid, tartaric acid, maleic acid, fumaric acid, malic acid, succinic acid, malonic acid. Such acids are preferably used in their acidic forms, and it may be preferred that their anhydrous forms are used, or mixtures thereof. Derivatives also include ester of the acids. Surprisingly, it has now been found that by using tararic, maleic and in particular malic acid as the acid in the dry effervescent granules, said granules deliver improved physical and/or chemical stability upon prolonged storage periods. When citric acid is used it may be preferred that its level is kept below 20% in the dry effervescent granules according to the present invention, in particular to facilitate processability and to allow appropriate storage stability of the granules.

The acid is preferably present in the dry effervescent granules according to the present invention at a level of from 0.1% to 99% by weight of the total granule, preferably from 3% to 75%, more preferably from 5% to 60% and most preferably from 15% to 50%.

In accordance with the present invention, 80% or more of the acid source preferably has a particle size in the range of from about 150 microns to about 1200 or even 1000 or even 710 microns.

Another essential feature of the present invention is a carbonate source, including carbonate, bicarbonate and percarbonate salts, in particular bicarbonate and/or carbonate. Suitable carbonates to be used herein include carbonate and hydrogen carbonate of potassium, lithium, sodium, and the like amongst which sodium and potassium carbonate are preferred. Suitable bicarbonates to be used herein include any alkali metal salt of bicarbonate like lithium, sodium, potassium and the like, amongst which sodium and potassium bicarbonate are preferred. Bicarbonate may be preferred to carbonate, because it is more-weigh effective, i.e., at parity weigh bicarbonate is a larger $CO_2$ "reservoir" than carbonate. However, the choice of carbonate or bicarbonate or mixtures thereof in the dry effervescent granules may be made depending on the pH desired in the aqueous medium wherein the dry effervescent granules are dissolved. For example where a relative high pH is desired in the aqueous medium (e.g., above pH 9.5) it may be preferred to use carbonate alone or to use a combination of carbonate and bicarbonate wherein the level of carbonate is higher than the level of bicarbonate, typically in a weight ratio of carbonate to bicarbonate from 0.1 to 10, more preferably from 1 to 5 and most preferably from 1 to 2.

The carbonate source is preferably present in the dry effervescent granules according to the present invention at a level of from 0.1% to 99% by weight of the total, preferably from 30% to 95%, more preferably from 45% to 85% and most preferably from 50% to 80%.

In accordance with the present invention, 80% or more of the carbonate source preferably has a particle size in the range of from about 50 microns to about 1200 or even from 150 to 1000 microns.

For optimum effervescence in aqueous medium the weight ratio of acid to carbonate and/or bicarbonate in the dry effervescent granules is from 0.1 to 10, preferably from 0.5 to 2.5 and more preferably from 1 to 2.

The diameter size of the dry effervescent granules of the present invention are preferably from 0.001 mm to 7 mm, preferably less than 2 mm.

The diameter size as defined herein can be determined by sieving a sample of the granules into a number of fractions (typically 5 fractions) on a series of sieves, with mazes of various diameter or aperture size. The mean diameter size of the granules can be calculated by plotting the weight fractions, obtained by the sieving, against the aperture size of the sieves. The mean particle size is taken to be the aperture size through which 50% by weight of the sample would pass.

The bulk density of the dry effervescent granules of the present invention is preferably from 500 g/l to 1200 g/l, more preferably from 700 g/l to 1100 g/l.

The dry effervescent granules of the present invention may optionally comprise a binder or a mixture thereof. Typically, the dry effervescent granules comprise up to 50 % by weight of the total granule of a binder or a mixture thereof, preferably up to 35% and more preferably up to 20%. Suitable binders to use herein are those known to those skilled in the art and include anionic surfactants like C6–C20 alkyl or alkylaryl sulphonates or sulphates, preferably C8–C20 alkylbenzene sulphonates, cellulose derivatives such as carboxymethylcellulose and homo- or co-polymeric polycarboxylic acid or their salts, nonionic surfactants, preferably C10–C20 alcohol ethoxylates containing from 5–100 moles of ethylene oxide per mole of alcohol and more preferably the C15–C20 primary alcohol ethoxylates containing from 20–100 moles of ethylene oxide per mole of alcohol. Of these tallow alcohol ethoxylated with 25 moles of ethylene oxide per mole of alcohol (TAE25) or 50 moles of ethylene oxide per mole of alcohol (TAE50) are preferred. Other preferred binders include the polymeric materials like polyvinylpyrrolidones with an average molecular weight of from 12 000 to 700 000 and polyethylene glycols with an average weight of from 600 to 10 000. Copolymers of maleic anhydride with ethylene, methylvinyl ether, methacrylic acid or acrylic acid are other examples of polymeric binders. Others binders further include C10–C20 mono and diglycerol ethers as well as C10–C20 fatty acids. In the embodiment of the present invention where a binder is desired C8–C20 alkylbenzene sulphonates are particularly preferred.

In a preferred embodiment the granules according to the present invention consists of an acid, carbonate source and optionally a binder, wherein the acid, carbonate source and optionally the binder are in close physical proximity.

The present invention further encompasses a process for manufacturing the dry effervescent granules of the present invention comprising an acid, carbonate source and optionally a binder, wherein the acid, carbonate source and optionally the binder are in close physical proximity. This process preferably comprises the steps of:

first mixing the acid, carbonate source and optionally the binder to form a mixture, then submitting the mixture to a, preferably pressure, agglomeration step to form a agglomerate mixture, and finally granulation of the agglomerate mixture in a granulation step so as to obtain said granules.

According to this process the effervescent raw materials and optionally the binder if present are first mixed together without the addition of water and/or moisture apart those coming from the raw materials themselves so as to obtain a dry free flowing powder mixture. Then this dry free flowing powder mixture comprising the effervescent particles (i.e. the acid and carbonate source), and optionally the binder particles if present, undergoes a pressure agglomeration step,, i.e. a dry process step wherein this free flowing powder mixture undergoes high external forces that bring the particles closely together thereby densifying the bulk mass of said particles and creating binding mechanisms between the solid effervescent particles and the binder if present. Indeed, pressure agglomeration results in an aggregation mechanism which is characterised by the presence of inter particles bonds between primary solid effervescent particles and a structure in which these effervescent particles are still identifiable and retain many of their characteristics, e.g. the ability to react together in presence of water to deliver carbon dioxide.

The increase of density associated to the preparation of the dry effervescent granules of the present invention obtainable by pressure agglomeration is closely linked to the pressure applied. Typically, the bulk density will increase up to 200 g/l, preferably from 10 g/l to 150 g/l, starting from the density of the mixture comprising the effervescent raw materials, i.e., acid and the carbonate source, and optionally the binder, before having undergone a pressure agglomeration.

Pressure agglomeration may be carried out using different processes which can be classified by the level of forces applied. A preferred process to be used herein is roller compaction. In this process the acid, bicarbonate and/or carbonate and optionally the binder after having been mixed together are forced between two compaction rolls that applies a pressure to said mixture so that the rotation of the rolls transforms the mixture into a compacted sheet/flake. This compacted sheet/flake is then granulated.

Typical roller compactors for use herein is for example Pharmapaktor L200/50P® commercially available from Hosokawa Bepex GmbH. The process variables during the pressure agglomeration step via roller compaction are the distance between the rolls, the feed rate, the compaction pressure and the roll speed. Typical feeding device is a feed screw. The distance between the rolls is typically from 0.5 cm to 10 cm, preferably from 3 to 7 cm, more preferably from 4 to 6 cm. The pressing force is typically between 20 kN and 120 kN, preferably from 30 kN to 100 kN, more preferably from 40 kN to 80 kN. Typically, the roll speed is between 1 rpm and 180 rpm, preferably from 2 rpm to 50 rpm and more preferably from 2 rpm to 35 rpm. Typically, the feed rate is between 1 rpm and 100 rpm, preferably from 5 rpm to 70 rpm, more preferably from 8 rpm to 50 rpm. Temperature at which compaction is carried out is not relevant, typically it varies from 0° C. to 40° C.

By "granulation step" it is meant that the resulting mixture after having undergone a pressure agglomeration step is cut into granules of the required length and rounded to obtain round or spherical granules according to the diameter size as defined herein before. In the preferred embodiment one way to carry out the granulation step after the roller compaction step is to mill the compacted flake/sheet. Milling may typically be carried out with a Flake Crusher FC 200® commercially available from Hosokawa Bepex GmbH.

Depending on the end diameter size desired for the dry effervescent granules the milled material may further be sieved. Such a sieving of the dry effervescent granules can for example be carried out with a commercially available Alpine Airjet Screen®.

Detergent Compositions

The present invention relates in one embodiment to a detergent composition comprising effervescence material, containing an acid and a carbonate source, whereby the acid and carbonate source are present in a granule together and/or the acid and the carbonate source are separated present in the composition, characterised in that the Effervescence Index (EI) is at least 10, or even at least 15, the Effervescence Index (EI) being $$EI = \frac{(L \times S \times 100)}{M} \times (NC_{inter} + NC_{intra})$$

wherein L is the number of acidic groups of the acid having a pKa of less or equal to 6, S is $$\sqrt[3]{(\text{solubility in water of the acid in g/litre, at } 25° C.)},$$

M is the molecular weight of the acid, $NC_{inter}$ is the density of contact points between the carbonate source and acid which are separated present in the composition per $mm^3$, and $NC_{intra}$ is (the weight fraction of the acid in said granule)× (the weight fraction of the carbonate source in said granule)× 12.

The $NC_{intra}$ and $NC_{inter}$ can be calculated according the method as set out in: T Tanaka and N Ouchiyama, *Ind. Chem. Fundam.*, 1980, 19, 338–340.

The $NC_{intra}$ is believed to represent the density of contact points between the acid and the carbonate source which are present in the same granule, per $mm^3$.

The compositions of the invention provide improved, efficient effervescence when the EI is at least 10.

The granular compositions of the present invention, as described herein, comprising the dry effervescent granules allow dispensing and dissolution in water of the granular compositions in a shorter period of time and at lower total level of effervescent particles/materials and ensure a faster and more effective delivery of detergent ingredients to the wash.

The compositions are preferably granular detergent compositions. When used herein, granular compositions include any composition which is in the form of granules, tablets, bars, flakes, extrudates, etc.

The compositions of the invention preferably comprise a dry effervescence granule, as described herein, comprising the acid and the carbonate source or part thereof. It may be preferred that all the acid of the composition, is comprised in the dry effervescence granule. Alternatively, it may be preferred that the composition comprises a dry effervescence granule and a dry-added acid and a dry-added carbonate source, preferably less than 10% by weight of acid, more preferably less than 8% or even less than 5% by weight.

The composition is preferably obtainable by a process which comprises the step of first forming a dry effervescent granule comprising an acid, carbonate source and optionally a binder wherein the acid, carbonate source and the binder are in close physical proximity, as described herein, and then addition of this granule to the other detergent ingredients of the composition.

The granular compositions of the present invention can be prepared with different bulk densities, preferably being from 500 to 1200 g/l, preferably from 750 to 1050 g/l. These compositions can be made by a variety of methods well known in the art, including dry-mixing, spray drying, agglomeration and granulation and combinations thereof.

In a preferred embodiment, the compositions, comprises from 0.1% to 99% by weight of the total composition of the dry effervescent granule, preferably from 2% to 50%, whereby soaking compositions preferably comprise of from 5% to 40% and most preferably from 15% to 35% by weight, and automatic laundry or dishwashing compositions preferably from 3% to 25%, more preferably from 4% to 15% by weight.

Additional Ingredients

The compositions according to the present invention typically comprise at least one active ingredient on top of said dry effervescent granules. In a preferred embodiment where the granular compositions according to the present invention are granular detergent compositions, they comprise at least an active detergent ingredient or a mixture thereof. Typically, the granular detergent compositions comprise from 0.1% to 99% by weight of the total composition of an active detergent ingredient or a mixture thereof, preferably from 1% to 80% and more preferably from 5% to 70%. By "active detergent ingredient" it is meant any ingredient known to those skilled in the art to provide a cleaning and/or bleaching benefit including for example surfactants, bleaches, enzymes, polymers, brighteners, builders, bleach activators, surfactants, alkali metal salt of silicate, chelating agents, fillers, soil suspending agents, dispersants, soil release agents, photoactivated bleaches such as Zn phthalocyanine sulphonate, dyes, dye transfer inhibitors, pigments, perfumes, suds suppressors, clay softening system, cationic fabric softening agents, and mixtures thereof. Depending on the end use intended different mixtures of ingredients and levels may be used.

In a preferred embodiment of the present invention the granular compositions comprise an oxygen bleach or a mixture thereof. Indeed, oxygen bleaches provide a multitude of benefits such as bleaching of stains, deodorization, as well as disinfectancy. The oxygen bleach in the granular compositions of the present invention may come from a variety of sources such as hydrogen peroxide or any of the addition compounds of hydrogen peroxide, or organic peroxyacid, or mixtures thereof. By addition compounds of hydrogen peroxide it is meant compounds which are formed by the addition of hydrogen peroxide to a second chemical compound, which may be for example an inorganic salt, urea or organic carboxylate, to provide the addition compound. Examples of the addition compounds of hydrogen peroxide include inorganic perhydrate salts, the compounds hydrogen peroxide forms with organic carboxylates, urea, and compounds in which hydrogen peroxide is clathrated.

Examples of inorganic perhydrate salts include perborate, percarbonate, perphosphate, peroxymonopersulfate and persilicate salts. The inorganic perhydrate salts are normally the alkali metal salts. The alkali metal salt of percarbonate, perborate, or mixtures thereof, are the preferred inorganic perhydrate salts for use herein. Preferred alkali metal salt of percarbonate is sodium percarbonate, which may also be or be present in the carbonate source. Preferred perborate is sodium perborate in the form of the monohydrate or tetrahydrate, respectively of nominal formula $NaBO_2H_2O_2$ and $NaBO_2H_2O_2.3H_2O$. Other suitable oxygen bleaches include persulphates, particularly potassium persulphate $K_2S_2O_8$ and sodium persulphate $Na_2S_2O_8$.

Typically, the granular compositions in the present invention comprise up to 90% by weight of the total composition of an oxygen bleach or mixtures thereof, preferably from 2% to 45% and more preferably from 10% to 40%.

It has now surprisingly been found that in the embodiment of the present invention wherein the granular compositions comprises at least an oxygen bleach as the active ingredient and the dry effervescent granules, the thermal stability of the granular composition upon prolonged storage is improved.

Thus, in a broadest aspect, the present invention also encompasses the use of such a dry effervescent granule as defined herein before, in a granular composition comprising an oxygen bleach, preferably percarbonate and/or perborate, for improved thermal stability of said composition upon storage.

Bleach Activators

Preferably the granular compositions herein further comprise a bleach activator or a mixture thereof up to 30% by weight of the total composition. Examples of suitable compounds of this type are disclosed in British Patent GB 1 586 769 and GB 2 143 231. Preferred examples of such compounds are tetracetyl ethylene diamine, (TAED), sodium 3, 5, 5 trimethyl hexanoyloxybenzene sulphonate, diperoxy dodecanoic acid as described for instance in U.S. Pat. No. 4,818,425 and nonylamide of peroxyadipic acid as described for instance in U.S. Pat. No. 4,259,201 and n-nonanoyloxybenzenesulphonate (NOBS), and acetyl triethyl citrate (ATC) such as described in European patent application 91870207, 7 e-Pthalimidoperoxyhexanoic acid (PAP), Phenolsulphonate Ester of N-nonanoyl-6-aminocaproic acid, aliphatic diacyl peroxide (DAP) having the general formula R—C(O)—O—O—(O)C—R1, wherein R and R1 can be the same or different and are linear or branched aliphatic groups having from 6 to 20 carbon atoms. Also particularly preferred are N-acyl caprolactam selected from the group consisting of substituted or unsubstituted benzoyl caprolactam, octanyl caprolactam, nonanoyl caprolactam, hexanoyl caprolactam, decanoyl caprolactam, undecenoyl caprolactam, formyl caprolactam, acetyl caprolactam, propanoyl caprolactam, butanoyl caprolactam pentanoyl caprolactam. The granular compositions herein may comprise mixtures of said bleach activators. Amide substituted alkyl peroxyacid precursors.

Amide substituted alkyl peroxyacid precursor compounds are suitable herein, including those of the following general formulae:

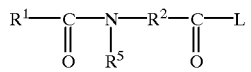

or

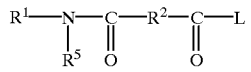

wherein $R^1$ is an alkyl group with from 1 to 14 carbon atoms, $R^2$ is an alkylene group containing from 1 to 14 carbon atoms, and $R^5$ is H or an alkyl group containing 1 to 10 carbon atoms and L can be essentially any leaving group. Amide substituted bleach activator compounds of this type are described in EP-A-01 70386.

A highly preferred bleach activator is nonanamido caproyl oxybenzene sulfonate, preferably in the form of the sodium salt (NACA-OBS).

Preferred mixtures of bleach activators herein comprise n-nonanoyloxybenzenesulphonate and/or nonanamido caproyl oxybenzene sulfonate together with a second bleach activator having a low tendency to generate diacyl peroxide, but which delivers mainly peracid. Said second bleach activators may include tetracetyl ethylene diamine (TAED), acetyl triethyl citrate (ATC), acetyl caprolactam, benzoyl caprolactam and the like, or mixtures thereof. Indeed, it has been found that mixtures of bleach activators comprising n-nonanoyloxybenzenesulphonate and said second activators, contribute to further boost particulate soil removal performance while exhibiting at the same time good performance on diacyl peroxide sensitive soil (e.g., beta-carotene) and on peracid sensitive soil (e.g., body soils).

Accordingly, the granular compositions herein may comprise from 0% to 15% by weight of the total composition of NOBS or NACA-OBS, preferably from 1% to 10% and more preferably from 3% to 7% and from 0% to 15% by weight of the total composition of said second bleach activator preferably from 1% to 10% and more preferably from 3% to 7%.

Surfactants

The granular compositions of the present invention may comprise a surfactant or a mixture thereof. Such surfactants may be desirable as they contribute to deliver effective stain removal performance on various stains including greasy stains, enzymatic stains, particulate soils and the like. Such surfactants may be present in the compositions according to the present invention, in amounts up to 50% by weight of the total composition, preferably of from 1% to 30% and more preferably of from 5% to 20%. Surfactants to be used herein include nonionic surfactants, anionic surfactants, cationic surfactants, amphoteric surfactants, zwitterionic surfactants, and mixtures thereof.

Anionic Surfactants

Alkyl ethoxylated sulfates as well as alkyl propoxylated sulfates are contemplated herein. Specific examples of substituted ammonium cations include methyl-, dimethyl-, trimethyl-ammonium and quaternary ammonium cations, such as tetramethyl-ammonium, dimethyl piperdinium and cations derived from alkanolamines such as ethylamine, diethylamine, triethylamine, mixtures thereof, and the like. Exemplary surfactants are $C_{12}$–$C_{18}$ alkyl polyethoxylate (1.0) sulfate, $C_{12}$–$C_{18}$E(1.0)M), $C_{12}$–$C_{18}$ alkyl polyethoxylate (2.25) sulfate, $C_{12}$–$C_{18}$E(2.25)M), $C_{12}$–$C_{18}$ alkyl polyethoxylate (3.0) sulfate $C_{12}$–$C_{18}$E(3.0), and $C_{12}$–$C_{18}$ alkyl polyethoxylate (4.0) sulfate $C_{12}$–$C_{18}$E(4.0)M), wherein M is conveniently selected from sodium and potassium.

Other anionic surfactants useful for detersive purposes can also be used herein. These can include salts (including, for example, sodium, potassium, ammonium, and substituted ammonium salts such as mono-, di- and triethanolamine salts) of soap, $C_9$–$C_{20}$ linear alkylbenzenesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl ester sulfonates such as $C_{14-16}$ methyl ester sulfonates; acyl glycerol sulfonates, fatty oleyl glycerol sulfates, alkyl phenol ethylene oxide ether sulfates, alkyl phosphates, isethionates such as the acyl isethionates, N-acyl taurates, alkyl succinamates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), acyl sarcosinates, sulfates of alkylpolysaccharides such as the sulfates of alkylpolyglucoside (the nonionic nonsulfated compounds being described below), branched primary alkyl sulfates, alkyl polyethoxy carboxylates such as those of the formula $RO(CH_2CH_2O)_kCH_2COO$—$M^+$ wherein R is a $C_8$–$C_{22}$ alkyl, k is an integer from 0 to 10, and M is a soluble salt-forming cation. Resin acids and hydrogenated resin acids are also suitable, such as rosin, hydrogenated rosin, and resin acids and hydrogenated resin acids present in or derived from tall oil. Further examples are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (herein incorporated by reference).

Other anionic surfactants suitable to be used herein may also include those according to the formula R—SO3M, wherein R is a substituted or unsubstituted, saturated or unsaturated, linear or branched hydrocarbon chain having from 6 to 40 carbon atoms and M is H or a cation. Preferably R is a substituted or unsubstituted, saturated or unsaturated, linear or branched alkyl group having from 6 to 40 carbon atoms, preferably from 8 to 30, more preferably from 10 to 25 and most preferably from 12 to 18. Preferably M is a cation which can be for example a metal cation (e.g., sodium, potassium, lithium, calcium, magnesium etc), ammonium or substituted-ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine and mixtures thereof and the like). Suitable anionic sulphonates to used herein are sodium paraffin sulphonate. They may be commercially available from Hoescht under the name of Hostapur® or Hostatat®.

Nonionic Surfactants

Suitable nonionic surfactants to be used herein are typically alkoxylated nonionic surfactants according to the formula RO—$(A)_n$H, wherein R is a substituted or unsubstituted, saturated or unsaturated, linear or branched hydrocarbon chain having from 6 to 40 carbon atoms, A is an alkoxy group having from 2 to 10 carbon atoms, and wherein n is an integer from 9 to 100, or a mixture thereof.

Preferably R is a substituted or unsubstituted, saturated or unsaturated, linear or branched alkyl group or aryl group having from 6 to 40 carbon atoms, preferably from 8 to 25, more preferably from 12 to 20. Typical aryl groups include the C12–C18 alkyl benzene groups. Preferably n is an integer from 9 to 100, more preferably from 10 to 80 and most preferably from 10 to 30. A preferably is an alkoxy group having from 2 to 8 carbon atoms, preferably from 2 to 5 and more preferably is propoxy and/or ethoxy.

Accordingly suitable alkoxylated nonionic surfactants for use herein are Dobanol® 91-10 (R is a mixture of $C_9$ to $C_{11}$ alkyl chains, A is ethoxy, n is 10) Luthensol AT® or AO® surfactants (where R is a mixture of linear C16 to C18 alkyl chain or unbranched C13–C15, A is ethoxy, and n can be 11, 18, 25, 50 or 80), or mixtures thereof. These Dobanol® surfactants are commercially available from SHELL, while the Luthensol® surfactants are available from BASF.

Suitable chemical processes for preparing the alkoxylated nonionic surfactants for use herein include condensation of corresponding alcohols with alkylene oxide, in the desired proportions. Such processes are well known to the man skilled in the art and have been extensively described in the art.

Such highly alkoxylated nonionic surfactants are particularly suitable to be used herein as they deliver improved particulate stains removal performance. Indeed, it is speculated that they act a soil suspending agent, i.e. they allow suspension of particulate soils and prevent/avoid the redeposition of said soils.

Other suitable surfactants to be used herein are sorbitan esters according to the formula $C_6H_9O_2$ $(C_2H_4O)_x$ $R_1R_2R_3$, wherein x is an integer of from 0 to 40, $R_1$, $R_2$ are independently OH or $(C_nH_{2n+1})COO$, and $R_3$ is $(C_nH_{2n+1})COO$ group, where n is an integer of from 11 to 17.

In the preferred compositions herein, x is 0 or 20, and the most preferred compositions herein comprise polyethoxylated (20) sorbitan tristearate, i.e. $C_6H_9O_2$ $(C_2H_4O)_{20}$ $(C_{17}H_{35}COO)_3$, or polyethoxylated (20) sorbitan monostearate, i.e. $C_6H_9O_2(C_2H_4O)_{20}(OH)_2(C_{17}H_{35}COO)$, or sorbitan monostearate, i.e. $C_6H_9O_2(OH)_2(C_{17}H_{35}COO)$, or sorbitan monopalmitate, i.e. $C_6H_9O_2(OH)_2(C_{15}H_{31}COO)$, or mixtures thereof. All these materials are commercially available under several trade names, such as Glycosperse TS 20 from Lonza (polyethoxylated sorbitan tristearate), Glycosperse S 20 from Lonza (polyethoxylated sorbitan monostearate), Radiasurf 7145 from Fina (sorbitan monostearate), Radiasurf 7135 from Fina (sorbitan monopalmitate), Armotan MP from Akzo (sorbitan monopalmitate). It has further been found that combining ethoxylated sorbitan esters with non-ethoxylated sorbitan esters provides better performance than either kind alone.

A suitable example of an alkyl aphodicarboxylic acid is Miranol(TM) C2M Conc. manufactured by Miranol, Inc., Dayton, N.J.

Polyhydroxy fatty acid amides suitable for use herein are those having the structural formula $R^2CONR^1Z$ wherein: R1 is H, $C_1$–$C_4$ hydrocarbyl, 2-hydroxy ethyl, 2-hydroxy propyl, ethoxy, propoxy, or a mixture thereof, preferable C1–C4 alkyl, more preferably $C_1$ or $C_2$ alkyl, most preferably $C_1$ alkyl (i.e., methyl); and $R_2$ is a $C_5$–$C_{31}$ hydrocarbyl, preferably straight-chain $C_5$–$C_{19}$ alkyl or alkenyl, more preferably straight-chain $C_9$–$C_{17}$ alkyl or alkenyl, most preferably straight-chain $C_{11}$–$C_{17}$ alkyl or alkenyl, or mixture thereof; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z preferably will be derived from a reducing sugar in a reductive amination reaction; more preferably Z is a glycityl.

Suitable fatty acid amide surfactants include those having the formula: $R^6CON(R^7)_2$ wherein $R^6$ is an alkyl group containing from 7 to 21, preferably from 9 to 17 carbon atoms and each $R^7$ is selected from the group consisting of hydrogen, $C_1$–$C_4$ alkyl, $C_1$–$C_4$ hydroxyalkyl, and —$(C_2H_4O)_xH$, where x is in the range of from 1 to 3.

Suitable alkylpolysaccharides for use herein are disclosed in U.S. Pat. No. 4,565,647, Llenado, issued Jan. 21, 1986, having a hydrophobic group containing from 6 to 30 carbon atoms and a polysaccharide, e.g., a polyglycoside, hydrophilic group containing from 1.3 to 10 saccharide units.

Preferred alkylpolyglycosides have the formula $$R^2O(C_nH_{2n}O)_t(\text{glycosyl})_x$$

wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 8. The glycosyl is preferably derived from glucose.

Suitable amine oxides include those compounds having the formula $R^3(OR^4)_xN^0(R^5)_2$ wherein $R^3$ is selected from an alkyl, hydroxyalkyl, acylamidopropoyl and alkyl phenyl group, or mixtures thereof, containing from 8 to 26 carbon atoms; $R^4$ is an alkylene or hydroxyalkylene group containing from 2 to 3 carbon atoms, or mixtures thereof; x is from 0 to 5, preferably from 0 to 3; and each $R^5$ is an alkyl or hydroxyalkyl group containing from 1 to 3, or a polyethylene oxide group containing from 1 to 3 ethylene oxide groups. Preferred are $C_{10\text{-}18}$ alkyl dimethylamine oxide, and $C_{10\text{-}18}$ acylamido alkyl dimethylamine oxide.

Cationic Surfactant

A cationic surfactant may be comprised in the surface active component of the composition of the invention, preferably be present at a level of from 0.5% to 80% by weight of the component, more preferably from 1% to 60%, most preferably from 3% to 50% by weight of the component.

Preferably the cationic surfactant is selected from the group consisting of cationic ester surfactants, cationic mono-alkoxylated amine surfactants, cationic bis-alkoxylated amine surfactants and mixtures thereof.

Cationic mono-alkoxylated Amine Surfactants

The optional cationic mono-alkoxylated amine surfactant for use herein, has the general formula:

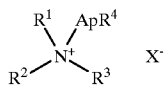

wherein $R^1$ is an alkyl or alkenyl moiety containing from about 6 to about 18 carbon atoms, preferably 6 to about 16 carbon atoms, most preferably from about 6 to about 11 carbon atoms; $R^2$ and $R^3$ are each independently alkyl groups containing from one to about three carbon atoms, preferably methyl; $R^4$ is selected from hydrogen (preferred), methyl and ethyl, $X^-$ is an anion such as chloride, bromide, methylsulfate, sulfate, or the like, to provide electrical neutrality; A is selected from $C_1$–$C_4$ alkoxy, especially ethoxy (i.e., —$CH_2CH_2O$—), propoxy, butoxy and mixtures thereof; and p is from 1 to about 30, preferably 1 to about 15, most preferably 1 to about 8.

Highly preferred cationic mono-alkoxylated amine surfactants for use herein are of the formula

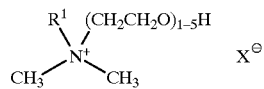

wherein $R^1$ is $C_6$–$C_{18}$ hydrocarbyl and mixtures thereof, preferably $C_6$–$C_{14}$, especially $C_6$–$C_{11}$ alkyl, preferably $C_8$ and $C_{10}$ alkyl, and X is any convenient anion to provide charge balance, preferably chloride or bromide.

As noted, compounds of the foregoing type include those wherein the ethoxy ($CH_2CH_2O$) units (EO) are replaced by butoxy, isopropoxy [$CH(CH_3)CH_2O$] and [$CH_2CH(CH_3O$] units (i-Pr) or n-propoxy units (Pr), or mixtures of EO and/or Pr and/or i-Pr units.

Cationic bis-alkoxylated Amine Surfactant

The cationic bis-alkoxylated amine surfactant for use herein, has the general formula:

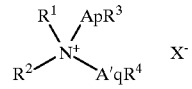

wherein $R^1$ is an alkyl or alkenyl moiety containing from about 6 to about 18 carbon atoms, preferably 6 to about 16 carbon atoms, more preferably 6 to about 11, most preferably from about 8 to about 10 carbon atoms; $R^2$ is an alkyl group containing from one to three carbon atoms, preferably methyl; $R^3$ and $R^4$ can vary independently and are selected from hydrogen (preferred), methyl and ethyl, $X^-$ is an anion such as chloride, bromide, methylsulfate, sulfate, or the like, sufficient to provide electrical neutrality. A and A' can vary independently and are each selected from $C_1$–$C_4$ alkoxy, especially ethoxy, (i.e., —$CH_2CH_2O$—), propoxy, butoxy and mixtures thereof; p is from 1 to about 30, preferably 1 to about 4 and q is from 1 to about 30, preferably 1 to about 4, and most preferably both p and q are 1.

Highly preferred cationic bis-alkoxylated amine surfactants for use herein are of the formula

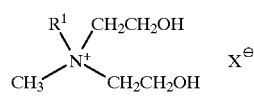

wherein $R^1$ is $C_6$–$C_{18}$ hydrocarbyl and mixtures thereof, preferably $C_6$, $C_8$, $C_{10}$, $C_{12}$, $C_{14}$ alkyl and mixtures thereof. X is any convenient anion to provide charge balance, preferably chloride. With reference to the general cationic bis-alkoxylated amine structure noted above, since in a preferred compound $R^1$ is derived from (coconut) $C_{12}$–$C_{14}$ alkyl fraction fatty acids, $R^2$ is methyl and $ApR^3$ and $A'qR^4$ are each monoethoxy.

Other cationic bis-alkoxylated amine surfactants useful herein include compounds of the formula:

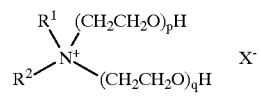

wherein $R^1$ is $C_6$–$C_{18}$ hydrocarbyl, preferably $C_6$–$C_{14}$ alkyl, independently p is 1 to about 3 and q is 1 to about 3, $R^2$ is $C_1$–$C_3$ alkyl, preferably methyl, and X is an anion, especially chloride or bromide.

Other compounds of the foregoing type include those wherein the ethoxy ($CH_2CH_2O$) units (EO) are replaced by butoxy (Bu) isopropoxy [CH(CH$_3$)CH$_2$O] and [CH$_2$CH (CH$_3$O] units (i-Pr) or n-propoxy units (Pr), or mixtures of EO and/or Pr and/or i-Pr units.

The surfactants may also include a cationic ester surfactant. That is, a preferably water dispersible compound having surfactant properties comprising at least one ester (ie —COO—) linkage and at least one cationically charged group. Suitable cationic ester surfactants, including choline ester surfactants, have for example been disclosed in U.S. Pat. Nos 4,228,042, 4,239,660 and 4260529.

Preferred cationic ester surfactants are those having the formula:

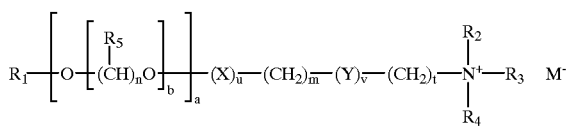

wherein R$_1$ is a C$_5$–C$_{31}$ linear or branched alkyl, alkenyl or alkaryl chain or M$^-$.N$^+$(R$_6$R$_7$R$_8$)(CH$_2$)$_s$; X and Y, independently, are selected from the group consisting of COO, OCO, O, CO, OCOO, CONH, NHCO, OCONH and NHCOO wherein at least one of X or Y is a COO, OCO, OCOO, OCONH or NHCOO group; R$_2$, R$_3$, R$_4$, R$_6$, R$_7$, and R$_8$ are independently selected from the group consisting of alkyl, alkenyl, hydroxyalkyl, hydroxy-alkenyl and alkaryl groups having from 1 to 4 carbon atoms; and R$_5$ is independently H or a C$_1$–C$_3$ alkyl group; wherein the values of m, n, s and t independently lie in the range of from 0 to 8, the value of b lies in the range from 0 to 20, and the values of a, u and v independently are either 0 or 1 with the proviso that at least one of u or v must be 1; and wherein M is a counter anion.

Preferably R$_2$, R$_3$ and R$_4$ are independently selected from CH$_3$ and —CH$_2$CH$_2$OH. Preferably M is selected from the group consisting of halide, methyl sulfate, sulfate, and nitrate, more preferably methyl sulfate, chloride, bromide or iodide. Preferred water dispersible cationic ester surfactants are the choline esters having the formula:

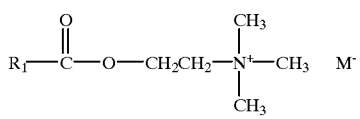

wherein R$_1$ is a C$_{11}$–C$_{19}$ linear or branched alkyl chain.

Particularly preferred choline esters of this type include the stearoyl choline ester quaternary methylammonium halides (R$^1$=C$_{17}$ alkyl), palmitoyl choline ester quaternary methylammonium halides (R$^1$=C$_{15}$ alkyl), myristoyl choline ester quaternary methylammonium halides (R$^1$=C$_{13}$ alkyl), lauroyl choline ester methylammonium halides (R$^1$=C$_{11}$ alkyl), cocoyl choline ester quaternary methylammonium halides (R$^1$=C$_{11}$–C$_{13}$ alkyl), tallowyl choline ester quaternary methylammonium halides (R$^1$=C$_{15}$–C$_{17}$ alkyl), and any mixtures thereof. The particularly preferred choline esters, given above, may be prepared by the direct esterification of a fatty acid of the desired chain length with dimethylaminoethanol, in the presence of an acid catalyst. The reaction product is then quaternized with a methyl halide, preferably in the presence of a solvent such as ethanol, propylene glycol or preferably a fatty alcohol ethoxylate such as C$_{10}$–C$_{18}$ fatty alcohol ethoxylate having a degree of ethoxylation of from 3 to 50 ethoxy groups per mole forming the desired cationic material. They may also be prepared by the direct esterification of a long chain fatty acid of the desired chain length together with 2-haloethanol, in the presence of an acid catalyst material. The reaction product is then quaternized with trimethylamine, forming the desired cationic material.

Other suitable cationic ester surfactants have the structural formulas below, wherein d may be from 0 to 20.

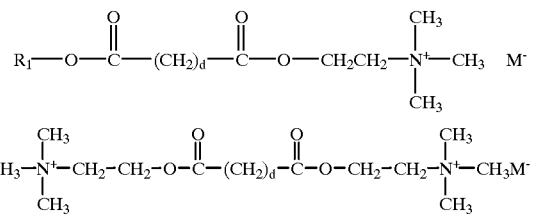

Amphoteric Surfactant

Suitable amphoteric surfactants for use herein include the amine oxide surfactants and the alkyl amphocarboxylic acids.

Suitable amine oxides include those compounds having the formula R$^3$(OR$^4$)$_x$N$^O$(R$^5$)$_2$ wherein R$^3$ is selected from an alkyl, hydroxyalkyl, acylamidopropoyl and alkyl phenyl group, or mixtures thereof, containing from 8 to 26 carbon atoms; R$^4$ is an alkylene or hydroxyalkylene group containing from 2 to 3 carbon atoms, or mixtures thereof; x is from 0 to 5, preferably from 0 to 3; and each R$^5$ is an alkyl or hydroxyalkyl group containing from 1 to 3, or a polyethylene oxide group containing from 1 to 3 ethylene oxide groups. Preferred are C$_{10}$–C$_{18}$ alkyl dimethylamine oxide, and C$_{10-18}$ acylamido alkyl dimethylamine oxide.

A suitable example of an alkyl aphodicarboxylic acid is Miranol(TM) C2M Conc. manufactured by Miranol, Inc., Dayton, N.J.

Zwitterionic Surfactant

Zwitterionic surfactants can also be comprised in the surface active component of the composition of the invention or the compositions containing the particle of the invention. These surfactants can be broadly described as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are exemplary zwitterionic surfactants for use herein.

Suitable betaines are those compounds having the formula R(R')$_2$N$^+$R$^2$COO$^-$ wherein R is a C$_6$–C$_{18}$ hydrocarbyl group, each R$^1$ is typically C$_1$–C$_3$ alkyl, and R$^2$ is a C$_1$–C$_5$ hydrocarbyl group. Preferred betaines are C$_{12-18}$ dimethylammonio hexanoate and the C$_{10-18}$ acylamidopropane (or ethane) dimethyl (or diethyl) betaines. Complex betaine surfactants are also suitable for use herein.

Alkali Metal Salt of Silicate

The granular compositions herein may comprise an alkali metal salt of silicate, or mixtures thereof, amongst the preferred optional ingredients. Preferred alkali metal salt of silicate to be used herein is sodium silicate. In the preferred embodiment herein wherein the granular compositions comprise an oxygen bleach and is typically intended for soaking application, it has been found that the decomposition of available oxygen produced in the soaking liquors upon dissolution of the granular compositions is reduced by the presence of at least 40 parts per million of sodium silicate in said soaking liquors.

Any type of alkali metal salt of silicate can be used herein, including the crystalline forms as well as the amorphous forms of said alkali metal salt of silicate or mixtures thereof.

Suitable crystalline forms of sodium silicate to be used are the crystalline layered silicates of the granular formula $$NaMSi_xO_{2x+1}.yH_2O$$

wherein M is sodium or hydrogen, x is a number from 1.9 to 4 and y is a number from 0 to 20, or mixtures thereof. Crystalline layered sodium silicates of this type are disclosed in EP-A-164 514 and methods for their preparation are disclosed in DE-A-34 17 649 and DE-A-37 42 043. For the purposes of the present invention, x in the general formula above has a value of 2, 3 or 4 and is preferably 2. More preferably M is sodium and y is 0 and preferred examples of this formula comprise the a, b, g and d forms of $Na_2Si_2O_5$. These materials are available from Hoechst AG FRG as respectively NaSKS-5, NaSKS-7, NaSKS-11 and NaSKS-6. The most preferred material is d-$Na_2Si_2O_5$, NaSKS-6. Crystalline layered silicates are incorporated in soaking compositions herein, either as dry mixed solids, or as solid components of agglomerates with other components.

Suitable amorphous forms of sodium silicate to be used herein have the following general formula:

$$NaMSi_xO_{2x+1}$$

wherein M is sodium or hydrogen and x is a number from 1.9 to 4, or mixtures thereof. Preferred to be used herein are the amorphous forms of $Si_2O_5Na_2O$.

Suitable Zeolites for use herein are aluminosilicates including those having the empirical formula:

$$Mz(zAlO2.ySiO2)$$

wherein M is sodium, potassium, ammonium or substituted ammonium, z is from about 0.5 to about 2; and y is 1; this material having a magnesium ion exchange capacity of at least about 50 milligram equivalents of CaCO3 hardness per gram of anhydrous aluminosilicate. Preferred zeolites which have the formula:

$$Naz\acute{i}(AlO2)z(SiO2)y\grave{u}.xH2O$$

wherein z and y are integers of at least 6, the molar ratio of z to y is in the range from 1.0 to about 0.5, and x is an integer from about 15 to about 264.

Useful materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), and Zeolite X. In an especially preferred embodiment, the crystalline aluminosilicate ion exchange material has the formula:

$$Na12\acute{i}(AlO2)12(SiO2)12\grave{u}.xH2O$$

wherein x is from 20 to 30, especially about 27. This material is known as Zeolite A. Preferably, the aluminosilicate has a particle size of about 0.1–10 microns in diameter.

Typically, the compositions herein may comprise from 0.5% to 15% by weight of the total composition of an alkali metal salt of silicate or mixtures thereof, preferably from 1% to 10% and more preferably from 2% to 7%.

Builders

The granular compositions herein may also comprise a builder or a mixture thereof. All builders known to those skilled in the art may be used herein. Suitable phosphate builders for use herein include sodium and potassium tripolyphosphate, pyrophosphate, polymeric metaphosphate having a degree of polymerization of from about 6 to 21, and orthophosphate. Other phosphorus builder compounds are disclosed in U.S. Pat. Nos. 3,159,581; 3,213,030; 3,422,021; 3,422,137; 3,400,176 and 3,400,148, incorporated herein by reference.

Suitable polycarboxylate builders for use herein include ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,120,874 and 4,102,903.

Other useful detergency builders include the ether hydroxypolycarboxylates, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Also suitable in the granular compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylate builders are disclosed in U.S. Pat. No. 4,144,226, Crutchfield et al, issued Mar. 13, 1979 and in U.S. Pat. No. 3,308,067, Diehl, issued Mar. 7, 1967. See also Diehl U.S. Pat. No. 3,723,322.

Other suitable polycarboxylate builders for use herein include builders according to formula I

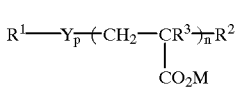

I wherein Y is a comonomer or comonomer mixture; $R^1$ and $R^2$ are bleach- and alkali-stable polymer-end groups; $R^3$ is H, OH or $C_{1-4}$ alkyl; M is H, alkali metal, alkaline earth metal, ammonium or substituted ammonium; p is from 0 to 2; and n is at least 10, or mixtures thereof.

Preferred polymers for use herein fall into two categories. The first category belongs to the class of copolymeric polymers which are formed from an unsaturated polycarboxylic acid such as maleic acid, citraconic acid, itaconic acid, mesaconic acid and salts thereof as first monomer, and an unsaturated monocarboxylic acid such as acrylic acid or an alpha-$C_{1-4}$ alkyl acrylic acid as second monomer. Referring to formula I hereinabove, the polymers belonging to said first class are those where p is not 0 and Y is selected from the acids listed hereinabove. Preferred polymers of this class are those according to formula I hereinabove, where Y is maleic acid. Also, in a preferred embodiment, $R^3$ and M are H, and n is such that the polymers have a molecular weight of from 1000 to 400 000 atomic mass units.

The second category of preferred polymers for use herein belongs to the class of polymers in which, referring to formula I hereinabove, p is 0 and $R^3$ is H or $C_{1-4}$ alkyl. In a preferred embodiment n is such that the polymers have a molecular weight of from 1000 to 400 000 atomic mass units. In a highly preferred embodiment, $R^3$ and M are H.

The alkali-stable polymer end groups $R^1$ and $R^2$ in formula I hereinabove suitably include alkyl groups, oxyalkyl groups and alkyl carboxylic acid groups and salts and esters thereof In the above, n, the degree of polymerization of the polymer can be determined from the weight average polymer molecular weight by dividing the latter by the average monomer molecular weight. Thus, for a maleic-acrylic copolymer having a weight average molecular weight of 15,500 and comprising 30 mole % of maleic acid derived units, n is 182 (i.e. 15,500/(116×0.3+72×0.7)).

Temperature-controlled columns at 40° C. against sodium polystyrene sulphonate polymer standards, available from Polymer Laboratories Ltd., Shropshire, UK, the polymer standards being 0.15M sodium dihydrogen phosphate and 0.02M tetramethyl ammonium hydroxide at pH 7.0 in 80/20 water/acetonitrile.

Of all the above, highly preferred polymers for use herein are those of the first category in which n averages from 100 to 800, preferably from 120 to 400.

Preferred builders for use herein are polymers of maleic or acrylic acid, or copolymers of maleic and acrylic acid.

Typically, the granular compositions of the present invention comprise up to 50% by weight of the total composition of a builder or mixtures thereof, preferably from 0.1 % to 20% and more preferably from 0.5 to 11%.

Chelating Agents

Preferably the granular compositions herein further comprise a chelating agent or mixtures thereof. Chelating agents are desired herein as they help to control the level of free heavy metal ions in the washing/soaking liquors, thus avoiding rapid decomposition of the oxygen released by oxygen bleach. Suitable amino carboxylate chelating agents which may be used herein include diethylene triamino pentacetic acid, ethylenediamine tetraacetates (EDTA), N-hydroxyethylethylenediamine triacetates, nitrilotriacetates, ethylenediamine tetraproprionates, triethylenetetraamine hexaacetates, and ethanoldiglycines, alkali metal ammonium and substituted ammonium salts thereof or mixtures thereof. Further suitable chelating agents include ethylenediamine-N,N'-disuccinic acids (EDDS) or alkali metal, alkaline earth metal, ammonium, or substituted ammonium salts thereof. Particularly suitable EDDS compounds are the free acid form and the sodium or magnesium salt or complex thereof. Also others suitable chelating agents may be the organic phosphonates, including amino alkylene poly(alkylene phosphonate), alkali metal ethane 1-hydroxy diphosphonates, nitrilo trimethylene phosphonates, ethylene diamine tetra methylene phosphonates and diethylene triamine penta methylene phosphonates. The phosphonate compounds may be present either in their acid form or in the form of their metal alkali salt. Preferably, the organic phosphonate compounds where present are in the form of their magnesium salt.

The granular compositions in the present invention may accordingly comprise from 0% to 5% by weight of the total compositions of said chelating agents, preferably from 0% to 3%, more preferably from 0.05% to 2%.

Fillers

The granular compositions herein may further comprise a filler like inorganic filler salts such as sulphates. Typically, the compositions of the present invention comprise up to 50% by weight of the total composition of a filler or a mixture thereof, preferably from 0.1% to 20% and more preferably from 0.5 % to 10%.

Enzymes

The granular compositions herein typically also comprise an enzyme or a mixture thereof. Preferably the compositions herein comprise a protease or mixtures thereof. Protease enzymes are usually present in preferred embodiments of the invention at levels sufficient to provide from 0.005 to 0.2 Anson units (AU) of activity per gram of composition. The proteolytic enzyme can be of animal, vegetable or, preferably microorganism preferred origin. More preferred is serine proteolytic enzyme of bacterial origin. Purified or nonpurified forms of enzyme may be used. Proteolytic enzymes produced by chemically or genetically modified mutants are included by definition, as are close structural enzyme variants. Particularly preferred by way of proteolytic enzyme is bacterial serine proteolytic enzyme obtained from Bacillus, *Bacillus subtilis* and/or *Bacillus licheniformis*. Suitable commercial proteolytic enzymes include Alcalase®, Esperase®, Durazym®, Savinase®, Maxatase®, Maxacal®, and Maxapem® 15 (protein engineered Maxacal); Purafect® and subtilisin BPN and BPN' are also commercially available. Preferred proteolytic enzymes also encompass modified bacterial serine proteases, such as those described in European Patent Application Serial Number 87303761.8, filed Apr. 28, 1987 (particularly pages 17, 24 and 98), and which is called herein "Protease B", and in European Patent Application 199,404, Venegas, published Oct. 29, 1986, which refers to a modified bacterial serine proteolytic enzyme, which is called "Protease A" herein. More preferred is what is called herein "Protease C", which is a triple variant of an alkaline serine protease from Bacillus in which tyrosine replaced valine at position 104, serine replaced asparagine at position 123, and alanine replaced threonine at position 274. Protease C is described in EP 90915958.4, corresponding to WO 91/06637, Published May 16, 1991, which is incorporated herein by reference. Genetically modified variants, particularly of Protease C, are also included herein.

Also suitable for use herein is a protease herein referred to as "Protease D" which is a carbonyl hydrolase variant having an amino acid sequence not found in nature, which is derived from a percursor carbonyl hydrolase by substituting a different amino acid for a plurality of amino acid residues at a position in said carbonyl hydrolase equivalent to position +76 in combination with one or more amino acid residue positions equivalent to those selected from the group consisting of +99, +101, +103, +107 and +123 in *Bacillus amyloliguefaciens subtilisin* as described in the concurrently filed patent applications of A. Baeck, C. K. Ghosh, P. P. Greycar, R. R. Bott and L. J. Wilson, entitled "Protease-Containing Cleaning Compositions" having U.S. Ser. No. 08/136,797 (P&G Case 5040), now abandoned, and "Bleaching Compositions Comprising Protease Enzymes" having U.S. Ser. No. 08/136,626, now abandoned, which are incorporated herein by reference.

Some preferred proteolytic enzymes are selected from the group consisting of Savinase®, Esperase®, Maxacal®, Purafect®, BPN', Protease A and Protease B, and mixtures thereof. Bacterial serine protease enzymes obtained from *Bacillus subtilis* and/or *Bacillus licheniformis* are preferred. Particularly preferred are Savinase®, Alcalase®, Protease A and Protease B.

Typically, the granular compositions herein also comprise an amylase or a mixtures thereof Engineering of enzymes for improved stability, e.g. oxidative stability is known. See, for example J. Biological Chem., vol. 260, No. 11, June 1985, pp 6518–6521. "Reference amylase" hereinafter refers to an amylase outside the scope of the amylase component of this invention and against which stability of any amylase within the invention can be measured.

The present invention thus makes use of amylases having improved stability in detergents, especially improved oxidative stability. A convenient absolute stability reference-point against which amylases used in the instant invention represent a measurable improvement is the stability of TERMAMYL (R) in commercial use in 1993 and available from Novo Nordisk A/S. This TERMAMYL (R) amylase is a "reference amylase". Amylases within the spirit and scope of the present invention share the characteristic of being "stability-enhanced" amylases, characterised, at a minimum, by a measurable improvement in one or more of: oxidative stability, e.g. to hydrogen peroxide/ tetraacetylethylenediamine in buffered solution at pH 9–10; thermal stability, e.g. at common wash temperatures such as about 60° C; or alkaline stability, e.g. at a pH from about 8 to about 11, all measured versus the above-identified reference-amylase. Preferred amylases herein can demonstrate further improvement versus more challenging reference amylases, the latter reference amylases being illustrated by any of the precursor amylases of which the amylases within the invention are variants. Such precursor amylases may themselves be natural or be the product of genetic engineering. Stability can be measured using any of the art-disclosed technical tests. See references disclosed in WO 94/02597, itself and documents therein referred to being incorporated by reference.

In general, stability-enhanced amylases respecting the invention can be obtained from Novo Nordisk A/S, or from Genencor International.

Preferred amylases herein have the common ability of being derived using site-directed mutagenesis from one or more of the Bacillus amylases, especially the Bacillus alpha-amylases, regardless of whether one, two or multiple amylase strains are the immediate precursors.

As noted, "oxidative stability-enhanced" amylases are preferred for use herein. Such amylases are non-limitingly illustrated by the following:

(a) An amylase according to the hereinbefore incorporated WO/94/02597, Novo Nordisk A/S, published Feb. 3, 1994, as further illustrated by a mutant in which substitution is made, using alanine or threonine (preferably threonine), of the methionine residue located in position 197 of the *Bacillus licheniformis* alpha-amylase, known as TERMAMYL (R), or the homologous position variation of a similar parent amylase, such as *Bacillus amyloliquefaciens, Bacillus subtilis,* or *Bacillus stearothermophilus;*

(b) Stability-enhanced amylases as described by Genencor International in a paper entitled "Oxidatively Resistant alpha-Amylases" presented at the 207th American Chemical Society National Meeting, Mar. 13–17, 1994, by C. Mitchinson. Therein it was noted that bleaches in automatic dishwashing detergents inactivate alpha-amylases but that improved oxidative stability amylases have been made by Genencor from *Bacillus licheniformis* NCIB8061. Methionine (Met) was identified as the most likely residue to be modified. Met was substituted, one at a time, in positions 8,15,197,256,304,366 and 438 leading to specific mutants, particularly important being M197L and M197T with the M197T variant being the most stable expressed variant. Stability was measured in CASCADE (R) and SUNLIGHT (R); Such enzymes are commercially available from Genencor under the trade name Plurafact Oxam®.

(c) Particularly preferred herein are amylase variants having additional modification in the immediate parent available from Novo Nordisk A/S. These amylases do not yet have a tradename but are those referred to by the supplier as QL37+M197T. Such enzymes are commercially available under the trade name SP 703 from Novo.

Any other oxidative stability-enhanced amylase can be used, for example as derived by site-directed mutagenesis from known chimeric, hybrid or simple mutant parent forms of available amylases.

Soil Suspending Agents

The granular compositions herein may also comprise a soil suspending agent or a mixture thereof, typically at a level up to 20% by weight, preferably from 0.1% to 10%, more preferably from 0.5% to 2%. Suitable soil suspending agents include ethoxylated diamines, ethoxylated polyamines, ethoxylated amine polymers as described in EP-A-112 593, incorporated herein by reference. Preferred soil suspending agents to be used herein include ethoxylated polyethyleneamine having a molecular weight of from 140 to 310 prior ethoxylation, ethoxylated 15–18 tetraethylenepentamine, ethoxylated 15–18 polyethylenamine, ethoxylated 15–18 ethylenediamine, ethoxylated polyethyleneimine having a molecular weight of from 600 to 1800 prior ethoxylation, and mixtures thereof.

Suds Suppressing Systems

The detergent compositions of the invention, when formulated for use in machine washing compositions, preferably comprise a suds suppressing system present at a level of from 0.01% to 15%, preferably from 0.05% to 10%, most preferably from 0.1% to 5% by weight of the composition.

Suitable suds suppressing systems for use herein may comprise essentially any known antifoam compound, including, for example silicone antifoam compounds and 2-alkyl alcanol antifoam compounds.

By antifoam compound it is meant herein any compound or mixtures of compounds which act such as to depress the foaming or sudsing produced by a solution of a detergent composition, particularly in the presence of agitation of that solution.

Particularly preferred antifoam compounds for use herein are silicone antifoam compounds defined herein as any antifoam compound including a silicone component. Such silicone antifoam compounds also typically contain a silica component. The term "silicone" as used herein, and in general throughout the industry, encompasses a variety of relatively high molecular weight polymers containing siloxane units and hydrocarbyl group of various types. Preferred silicone antifoam compounds are the siloxanes, particularly the polydimethylsiloxanes having trimethylsilyl end blocking units.

Other suitable antifoam compounds include the monocarboxylic fatty acids and soluble salts thereof. These materials are described in U.S. Pat. No. 2,954,347, issued Sep. 27, 1960 to Wayne St. John. The monocarboxylic fatty acids, and salts thereof, for use as suds suppressor typically have hydrocarbyl chains of 10 to 24 carbon atoms, preferably 12 to 18 carbon atoms. Suitable salts include the alkali metal salts such as sodium, potassium, and lithium salts, and ammonium and alkanolammonium salts.

Other suitable antifoam compounds include, for example, high molecular weight fatty esters (e.g. fatty acid triglycerides), fatty acid esters of monovalent alcohols, aliphatic $C_{18}$–$C_{40}$ ketones (e.g. stearone) N-alkylated amino triazines such as tri- to hexa-alkylmelamines or di- to tetra alkyldiamine chlortriazines formed as products of cyanuric chloride with two or three moles of a primary or secondary amine containing 1 to 24 carbon atoms, propylene oxide, bis stearic acid amide and monostearyl di-alkali metal (e.g. sodium, potassium, lithium) phosphates and phosphate esters.

A preferred suds suppressing system comprises
(a) antifoam compound, preferably silicone antifoam compound, most preferably a silicone antifoam compound comprising in combination
  (i) polydimethyl siloxane, at a level of from 50% to 99%, preferably 75% to 95% by weight of the silicone antifoam compound; and
  (ii) silica, at a level of from 1% to 50%, preferably 5% to 25% by weight of the silicone/silica antifoam compound;
wherein said silica/silicone antifoam compound is incorporated at a level of from 5% to 50%, preferably 10% to 40% by weight;
(b) a dispersant compound, most preferably comprising a silicone glycol rake copolymer with a polyoxyalkylene content of 72–78% and an ethylene oxide to propylene oxide ratio of from 1:0.9 to 1:1.1, at a level of from 0.5% to 10%, preferably 1% to 10% by weight; a particularly preferred silicone glycol rake copolymer of this type is DC0544, commercially available from DOW Corning under the tradename DC0544;
(c) an inert carrier fluid compound, most preferably comprising a $C_{16}$–$C_{18}$ ethoxylated alcohol with a degree of ethoxylation of from 5 to 50, preferably 8 to 15, at a level of from 5% to 80%, preferably 10% to 70%, by weight;

A highly preferred particulate suds suppressing system is described in EP-A-0210731 and comprises a silicone antifoam compound and an organic carrier material having a melting point in the range 50° C. to 85° C., wherein the organic carrier material comprises a monoester of glycerol and a fatty acid having a carbon chain containing from 12 to 20 carbon atoms. EP-A-0210721 discloses other preferred particulate suds suppressing systems wherein the organic carrier material is a fatty acid or alcohol having a carbon chain containing from 12 to 20 carbon atoms, or a mixture thereof, with a melting point of from 45° C. to 80° C.

Clay Softening Systems

The detergent compositions of the present invention typically intended for washing fabrics in domestic washing machine may contain a clay softening system comprising a clay mineral compound and optionally a clay flocculating agent.

The clay mineral compound is preferably a smectite clay compound. Smectite clays are disclosed in the U.S. Pat. No. Pat. Nos. 3,862,058, 3,948,790, 3,954,632 and 4,062,647. European Patents Nos. EP-A-299,575 and EP-A-313,146 in the name of the Procter and Gamble Company describe suitable organic polymeric clay flocculating agents.

Polymeric Dye Transfer Inhibiting Agents

The detergent compositions of the present invention typically intended for washing fabrics in domestic washing machine may also comprise from 0.01% to 10 %, preferably from 0.05% to 0.5% by weight of polymeric dye transfer inhibiting agents.

The polymeric dye transfer inhibiting agents are preferably selected from polyamine N-oxide polymers, copolymers of N-vinylpyrrolidone and N-vinylimidazole, polyvinylpyrrolidonepolymers or combinations thereof.

a) Polyamine N-oxide Polymers

Polyamine N-oxide polymers suitable for use herein contain units having the following structure formula:

wherein P is a polymerisable unit, and

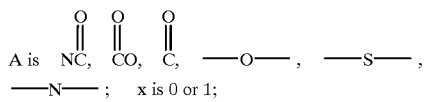

R are aliphatic, ethoxylated aliphatics, aromatic, heterocyclic or alicyclic groups or any combination thereof whereto the nitrogen of the N—O group can be attached or wherein the nitrogen of the N—O group is part of these groups.

The N—O group can be represented by the following general structures:

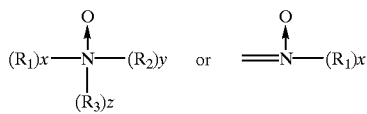

wherein R1, R2, and R3 are aliphatic groups, aromatic, heterocyclic or alicyclic groups or combinations thereof, x or/and y or/and z is 0 or 1 and wherein the nitrogen of the N—O group can be attached or wherein the nitrogen of the N—O group forms part of these groups. The N—O group can be part of the polymerisable unit (P) or can be attached to the polymeric backbone or a combination of both.

Suitable polyamine N-oxides wherein the N—O group forms part of the polymerisable unit comprise polyamine N-oxides wherein R is selected from aliphatic, aromatic, alicyclic or heterocyclic groups. One class of said polyamine N-oxides comprises the group of polyamine N-oxides wherein the nitrogen of the N—O group forms part of the R-group. Preferred polyamine N-oxides are those wherein R is a heterocyclic group such as pyrridine, pyrrole, imidazole, pyrrolidine, piperidine, quinoline, acridine and derivatives thereof.

Other suitable polyamine N-oxides are the polyamine oxides whereto the N—O group is attached to the polymerisable unit. A preferred class of these polyamine N-oxides comprises the polyamine N-oxides having the general formula (I) wherein R is an aromatic,heterocyclic or alicyclic groups wherein the nitrogen of the N—O functional group is part of said R group. Examples of these classes are polyamine oxides wherein R is a heterocyclic compound such as pyrridine, pyrrole, imidazole and derivatives thereof.

The polyamine N-oxides can be obtained in almost any degree of polymerisation. The degree of polymerisation is not critical provided the material has the desired water-solubility and dye-suspending power. Typically, the average molecular weight is within the range of 500 to 1000,000.

b) Copolymers of N-vinylpyrrolidone and N-vinylimidazole

Suitable herein are copolymers of N-vinylimidazole and N-vinylpyrrolidone having an average molecular weight range of from 5,000 to 50,000. The preferred copolymers have a molar ratio of N-vinylimidazole to N-vinylpyrrolidone from 1 to 0.2.

c) Polyvinylpyrrolidone

The detergent compositions herein may also utilize polyvinylpyrrolidone ("PVP") having an average molecular weight of from 2,500 to 400,000. Suitable polyvinylpyrrolidones are commercially available from ISP Corporation, New York, N.Y. and Montreal, Canada under the product names PVP K-15 (viscosity molecular weight of 10,000), PVP K-30 (average molecular weight of 40,000), PVP K-60 (average molecular weight of 160,000), and PVP K-90 (average molecular weight of 360,000). PVP K-15 is also available from ISP Corporation. Other suitable polyvinylpyrrolidones which are commercially available from BASF Cooperation include Sokalan HP 165 and Sokalan HP 12.

d) Polyvinyloxazolidone

The detergent compositions herein may also utilize polyvinyloxazolidones as polymeric dye transfer inhibiting agents. Said polyvinyloxazolidones have an average molecular weight of from 2,500 to 400,000.

e) Polyvinylimidazole

The detergent compositions herein may also utilize polyvinylimidazole as polymeric dye transfer inhibiting agent. Said polyvinylimidazoles preferably have an average molecular weight of from 2,500 to 400,000.

Optical Brighteners

The detergent compositions herein also optionally contain from about 0.005% to 5% by weight of certain types of hydrophilic optical brighteners.

Hydrophilic optical brighteners useful herein include those having the structural formula:

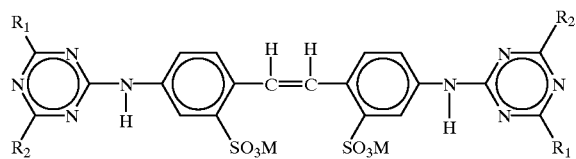

wherein $R_1$ is selected from anilino, N-2-bis-hydroxyethyl and NH-2-hydroxyethyl; $R_2$ is selected from N-2-bis-hydroxyethyl, N-2-hydroxyethyl-N-methylamino, morphilino, chloro and amino; and M is a salt-forming cation such as sodium or potassium. When in the above formula, $R_1$ is anilino, $R_2$ is N-2-bis-hydroxyethyl and M is a cation such as sodium, the brightener is 4,4'-bis[(4-anilino-6-(N-2-bis-hydroxyethyl)-s-triazine-2-yl)amino]-2,2'-stilbenedisulfonic acid and disodium salt. This particular brightener species is commercially marketed under the tradename Tinopal-UNPA-GX by Ciba-Geigy Corporation. Tinopal-UNPA-GX is the preferred hydrophilic optical brightener useful in the detergent compositions herein. When in the above formula, $R_1$ is anilino, $R_2$ is N-2-hydroxyethyl-N-2-methylamino and M is a cation such as sodium, the brightener is 4,4'-bis[(4-anilino-6-(N-2-hydroxyethyl-N-methylamino)-s-triazine-2-yl)amino]2,2'-stilbenedisulfonic acid disodium salt. This particular brightener species is commercially marketed under the tradename Tinopal 5BM-GX by Ciba-Geigy Corporation. When in the above formula, $R_1$ is anilino, $R_2$ is morphilino and M is a cation such as sodium, the brightener is 4,4'-bis[(4-anilino-6-morphilino-s-triazine-2-yl)amino]2,2'-stilbenedisulfonic acid, sodium salt. This particular brightener species is commercially marketed under the tradename Tinopal AMS-GX by Ciba Geigy Corporation.

Cationic Fabric Softening Agents

Cationic fabric softening agents can also be incorporated into the granular compositions of the present invention. Suitable cationic fabric softening agents include the water insoluble tertiary amines or dilong chain amide materials as disclosed in GB-A-1 514 276 and EP-B-0 011 340. Cationic fabric softening agents are typically incorporated at total levels of from 0.5% to 15% by weight, normally from 1% to 5% by weight.

The Process of Soaking Fabrics

The present invention encompasses processes of soaking fabrics. Indeed, the present invention encompasses a process of soaking fabrics, wherein said fabrics are immersed in a soaking liquor comprising water and an effective amount of a granular composition as described hereinbefore, for an effective period of time, then removed from said soaking liquor.

As used herein, the expression "process of soaking fabrics" refers to the action of leaving fabrics to soak in a soaking liquor comprising water and a composition as described hereinabove, for a period of time sufficient to clean said fabrics. In contrast to typical laundering operation using a washing machine, the soaking process herein allows prolonged contact time between the fabrics and the soaking liquor, typically up to 24 hours. The soaking process can be performed independently from any other process, such as a typical laundering operation, or a first step before a second typical laundering step, or a second step after a first typical laundering operation. In the preferred soaking processes of the invention, fabrics are left to soak for a period of time ranging from 1 minute to 24 hours, preferably from 10 minutes to 24 hours, more preferably from 30 minutes to 18 hours, even more preferably 1 hour to 6 hours. After the fabrics have been immersed in said soaking liquor for a sufficient period of time, they can be removed and rinsed with water. The fabrics can also be washed in a normal laundering operation after they have been soaked, with or without having been rinsed in-between the soaking operation and the subsequent laundering operation.

In the soaking process herein, a soaking composition described hereinabove is diluted in an appropriate amount of water to produce a soaking liquor. Suitable doses may range from 40 to 55 grams of soaking composition in 3.5 to 5 liters of water, down to 90 to 100 grams of soaking composition in 20 to 45 liters of water. Typically one dose is 40–55 grams in 3.5 to 5 liters for a concentrated soak (bucket/sink). For washing machine soaked, the dose is 90–100 grams in about 20 (Europe) to 45 (U.S.) liters of water. The fabrics to be soaked are then immersed in the soaking liquor for an appropriate period of time. There are factors which may influence overall stain removal performance of the process on various dirt/soils. Such factors include prolonged soaking time. Indeed, the longer fabrics are soaked, the better the end results. Thus the instructions on commercially available soaking compositions ideally recommend overnight soaking time, i.e., 8 hours up to 24 hours. An advantage of the present invention is that effective results are obtained even in short soaking operations, typically below 30 minutes. Another factor is the initial warm or warmluke temperature. Indeed, higher initial temperatures of the soaking liquors ensure large benefits in performance. Another advantage of the present invention is that effective results are obtained even at low soaking temperature, typically below 30° C., or even below 20° C.

The process herein is suitable for cleaning a variety of fabrics, but finds a preferred application in the soaking of socks, which are particularly exposed to silt and clay pick-up.

The Process of Washing Fabrics in Laundry Domestic Washing Machine

The present invention encompasses processes of washing fabrics. Indeed, the present invention encompasses a process of washing fabrics in a domestic washing machine comprising, introducing into a dispensing device which is placed in the drum of the washing machine, or introducing into the dispensing drawer of a washing machine, an effective amount of a granular detergent composition comprising a dry effervescent granules as described herein.

Machine laundry methods herein typically comprise treating soiled laundry with an aqueous wash solution in a washing machine having dissolved or dispensed therein an effective amount of a machine laundry detergent composition in accord with the invention. By an effective amount of the detergent composition it is meant from 40 g to 300 g of product dissolved or dispersed in a wash solution of volume from 5 to 65 liters, as are typical product dosages and wash solution volumes commonly employed in conventional machine laundry methods.

In a preferred use aspect a dispensing device is employed in the washing method. The dispensing device is charged with the detergent product, and is used to introduce the product directly into the drum of the washing machine before the commencement of the wash cycle. Its volume capacity should be such as to be able to contain sufficient detergent product as would normally be used in the washing method.

Once the washing machine has been loaded with laundry the dispensing device containing the detergent product is placed inside the drum. At the commencement of the wash cycle of the washing machine water is introduced into the drum and the drum periodically rotates. The design of the dispensing device should be such that it permits containment of the dry detergent product but then allows release of this product during the wash cycle in response to its agitation as the drum rotates and also as a result of its contact with the wash water.

To allow for release of the detergent composition during the wash the device may possess a number of openings through which the product may pass. Alternatively, the device may be made of a material which is permeable to liquid but impermeable to the solid product, which will allow release of dissolved product. Preferably, the detergent product will be rapidly released at the start of the wash cycle thereby providing transient localised high concentrations of product in the drum of the washing machine at this stage of the wash cycle.

Preferred dispensing devices are reusable and are designed in such a way that container integrity is maintained in both the dry state and during the wash cycle. Especially preferred dispensing devices for use with the composition of the invention have been described in the following patents; GB-B-2, 157, 717, GB-B-2, 157, 718, EP-A-0201376, EP-A-0288345 and EP-A-0288346. An article by J.Bland published in Manufacturing Chemist, November 1989, pages 41–46 also describes especially preferred dispensing devices for use with granular laundry products which are of a type commonly know as the "granulette". Another preferred dispensing device for use with the compositions of this invention is disclosed in PCT Patent Application No. WO94/11562. Especially preferred dispensing devices are disclosed in European Patent Application Publication Nos. 0343069 & 0343070. The latter Application discloses a device comprising a flexible sheath in the form of a bag extending from a support ring defining an orifice, the orifice being adapted to admit to the bag sufficient product for one washing cycle in a washing process. A portion of the washing medium flows through the orifice into the bag, dissolves the product, and the solution then passes outwardly through the orifice into the washing medium. The support ring is provided with a masking arrangement to prevent egress of wetted, undissolved, product, this arrangement typically comprising radially extending walls extending from a central boss in a spoked wheel configuration, or a similar structure in which the walls have a helical form. Alternatively, the dispensing device may be a flexible container, such as a bag or pouch. The bag may be of fibrous construction coated with a water impermeable protective material so as to retain the contents, such as is disclosed in European published Patent Application No. 0018678. Alternatively it may be formed of a water-insoluble synthetic polymeric material provided with an edge seal or closure designed to rupture in aqueous media as disclosed in European published Patent Application Nos. 0011500, 0011501, 0011502, and 0011968. A convenient form of water frangible closure comprises a water soluble adhesive disposed along and sealing one edge of a pouch formed of a water impermeable polymeric film such as polyethylene or polypropylene.

Packaging for the Granular Compositions

Commercially marketed executions of the granular compositions can be packaged in any suitable container including those constructed from paper, cardboard, plastic materials and any suitable laminates.

Form of the Cleaning Compositions

The granular compositions can be made via a variety of methods, including dry-mixing, extruding, compressing and agglomerating of the various components comprised in the detergent composition. The dry effervescence granule of the invention can be present in the cleaning compositions as a separate component of the composition, or can be part of or added to other components or compounds of the compositions.

The cleaning compositions can take a variety of physical forms including granular, flakes, extrudates, tablet or bar forms. The cleaning compositions are particularly the so-called concentrated granular detergent compositions adapted to be added to a washing machine by means of a dispensing drawer or by means of a dispensing device placed in the machine drum with the soiled fabric load.

The mean particle size of the base composition of granular cleaning compositions containing the foaming composition in accordance with the invention can be from 0.1 mm to 5.0 mm, but it should preferably be such that no more that 5% of particles are greater than 2.5 mm in diameter, or even 1.7 mm and that not more than 5% of particles are less than 0.1 5 mm in diameter.

The term mean particle size as defined herein is calculated by sieving a sample of the composition into a number of fractions (typically 5 fractions) on a series of Tyler sieves. The weight fractions thereby obtained are plotted against the aperture size of the sieves. The mean particle size is taken to be the aperture size through which 50% by weight of the sample would pass.

The bulk density of granular cleaning or detergent compositions containing the particulate composition in accordance with the present invention typically have a bulk density of at least 300 g/liter, more preferably from 500 g/liter or even 650 g/liter to 1200 g/liter, more preferably to 850 g/liter.

The Stain Removal Performance Test Method

The stain removal performance of a given composition on a soiled fabric for example under soaking conditions, may be evaluated by the following test method. Soaking liquors are formed by diluting for instance 45 g of the soaking compositions herein in 3.78 liter of water or 90 g of the soaking composition in 45 liters of water. Fabrics are then immersed in the resulting soaking liquor for a time ranging from 1 minute to typically 18 hours. Finally, the fabrics are removed from the soaking liquors, rinsed with water and washed with a regular washing process, handwash or washing machine wash, with a regular detergent, with or without re-using the soaking liquor, then said fabrics are left to dry.

For example, typical soiled fabrics to be used in this stain removal performance test may be commercially available from EMC (Empirical Manufacturing Company) Cincinnati, Ohio, USA, such as clay, grass, spaghetti sauce, gravy, dirty motor oil, barbecue sauce, blood on two different substrates: cotton (CW120) and polycotton (PCW28).

The stain removal performance may be evaluated by comparing side by side the soiled fabrics treated with the composition according to the present invention with those treated with the reference, e.g., the same composition without such dry effervescent granules according to the present invention. A visual grading scale may be used to assign differences in panel score units (psu), in a range from 0 to 4.

The Thermal Stability Test Method

To evaluate thermal stability of a given composition, a sample thereof may be placed in an oven whose temperature is setted at 60° C. When the sample reaches the oven temperature (60° C.), it is isolated with an adiabatic bell and its temperature is monitored for 2 hours. The self heating rate is determined (SHR, average temperature increase over the first 2 hours).. The lower the SHR the more stable is the composition.

the Effervescence Test Method

Effervescence of a given granular composition may be measured via visual grading. A composition according to the present invention and a reference composition without the dry effervescent granules, or a reference composition wherein the effervescent materials are uniformly and separately distributed in the whole granular composition, are each individually diluted into 5 liters of water at 35° C. and the resulting generation of carbon dioxide is evaluated by visual grading.

The Dissolution Test Method

Dissolution characteristics of a given granular composition ma y be measured via visual grading. A composition according to the present invention and a reference composition without the dry effervescent granules, or a reference composition wherein the effervescent materials are uniformly and separately distributed in the whole granular composition, are each individually diluted into 2 liters of water at 5° C. Then the water is evaporated with a standard evaporator with a black fabric instead of a paper filter. A visual grading scale may be used to assign differences in panel score units (psu), in a range from 0 to 4.

The Dispensing Test Method

Dispensing can be evaluated by means of a standard test using a washing machine by introducing a given weight of composition in the dispenser and flowing water over a given period of time. Then measuring the dry weight of laundry detergent composition remaining in the dispenser, in grams, and calculating the weight percentage of composition not dispensed into the machine.

Bulk Density Test Method

Bulk density of the granular composition and/or of the dry effervescent granules of the present invention may be measured by means of a simple funnel and cup device consisting of a conical funnel moulded rigidly on a base and provided with a flap valve at its lower extremity to allow the contents of the funnel to be emptied into an axially aligned cylindrical cup disposed below the funnel. The funnel is 130 mm high and has internal diameters of 130 mm and 40 mm at its respective upper and lower extremities. It is mounted so that the lower extremity is 140 mm above the upper surface of the base. The cup has an overall height of 90 mm, an internal height of 87 mm and an internal diameter of 84 mm. Its nominal volume is 500 ml. To carry out a measurement, the funnel is filled with powder by hand pouring, the flap valve is opened and powder allowed to overfill the cup. The filled cup is removed from the frame and excess powder removed from the cup by passing a straight edged implement e.g.; a knife, across its upper edge. The filled cup is then weighed and the value obtained for the weight of powder doubled to provide a bulk density in g/liter. Replicate measurements are made as required.

The following examples will further illustrate the present invention.

EXAMPLES

I) Soaking Compositions

The following soaking compositions are prepared by mixing the listed ingredients in the listed proportions.

| Ingredients | (% w/w) | (% w/w) | (% w/w) |
|---|---|---|---|
| | 1 | 2 | 3 |
| Sodium percarbonate | 22 | 22 | 22 |
| Alcohol ethoxylated EO 25 | 2 | — | — |
| Alcohol ethoxylated EO 11 | — | 2 | — |
| Alcohol ethoxylated EO 50 | — | — | 2 |
| Anionic (LAS/AS/AES) | 8 | 8 | 8 |
| DTPA | 0.2 | 0.2 | 0.2 |
| TAED | 8.3 | 5 | 5 |
| Dry Effervescent granule | 20 | 10 | 10 |
| sodium bicarbonate 40% | | | |
| sodium carbonate 16% | | | |
| Malic acid 44% | | | |
| Minors and inerts | up to 100 | up to 100 | up to 100 |
| | 4 | 5 | 6 |
| Sorbitan mono-stearate (SMS) | 2.5 | — | — |
| Sorbitan monostearate EO 20 (SMS EO 20) | — | 3.0 | — |
| Sorbitan tristearate EO 20 (STS EO 20) | 0.5 | — | 3.0 |
| Citric acid | 10 | 10 | 10 |
| Polyacrylate (Acusol 445 ND ®) | 11 | 11 | 11 |
| Silicate (amorphous; 1.6 r) | 0.4 | 0.4 | 0.4 |
| Sodium percarbonate | 31 | 31 | 31 |
| NOBS | 6 | 6 | 6 |
| TAED | 5 | 5 | 5 |
| Anionic (LAS/AS/AES) | 7 | 7 | 7 |
| Alcohol EO 25 | 2 | 2 | 2 |
| Dry Effervescent granule | 20 | 20 | 20 |
| sodium bicarbonate 40% | | | |
| sodium carbonate 16% | | | |
| malic acid 40% | | | |
| citric acid 4% | | | |
| Others, inerts and minors | up to 100 | up to 100 | up to 100 |
| | 7 | 8 | 9 |
| Sodium percarbonate | 22 | 22 | 22 |
| Alcohol ethoxylated EO 25 | 2 | 2 | 2 |
| Anionic (LAS/AS/AES/NaPS) | 10 | 10 | 10 |
| Enzymes (amylase, lipase, protease) | 1.9 | 1.9 | 1.9 |
| Zeolites | 6.0 | 4.0 | 2.0 |
| Polymers (polycarboxylate, carboxy methilcellulose) | 7.5 | 7.5 | 7.5 |
| DTPA | 0.2 | 0.2 | 0.2 |

-continued

| Ingredients | (% w/w) | (% w/w) | (% w/w) |
|---|---|---|---|
| TAED | 8.0 | 8.0 | 8.0 |
| NOBS | 4.0 | — | — |
| Brightener | 0.15 | 0.15 | 0.15 |
| Zn pthalocyanine sulphonate | 0.06 | 0.06 | 0.06 |
| Hydroxyethylidendiphosphonate | 0.18 | 0.18 | 0.18 |
| Dry Effervescent granule | 20 | 15 | 10 |
| sodium bicarbonate 40% | | | |
| sodium carbonate 10% | | | |
| Malic acid 44% | | | |
| LAS 6% | | | |
| Minors and inerts | up to 100 | up to 100 | up to 100 |
| | 10 | 11 | 12 |
| Sodium percarbonate | 45 | 40 | 35 |
| Anionic (LAS/AS/AES) | 8 | 8 | 8 |
| DTPA | 0.2 | 0.2 | 0.2 |
| TAED | 8.3 | 8.3 | 8.3 |
| Brightener | 0.15 | 0.15 | 0.15 |
| Zn pthalocyanine sulphonate | 0.06 | 0.06 | 0.06 |
| Enzymes (amylase, lipase, protease) | 1.9 | 1.9 | 1.9 |
| Dry Effervescent granule | 20 | 15 | 10 |
| sodium bicarbonate 40% | | | |
| sodium carbonate 16% | | | |
| Malic acid 44% | | | |
| Minors and inerts | up to 100 | up to 100 | up to 100 |

TAED is tetracetyl ethylene.
NOBS is n-nonanoyloxybenzenesulphonate.
NaPS is sodium parraffin sulphonate.
DTPA is Diethylene-triamine-Penta Acetic acid.
LAS is C12 alkylbenzene sulphonate.

Soaking liquors are formed by diluting each time 45 g of the above compositions in between 3.5 lit. to 5.0 lit. of water. 0.5 to 2 Kg of fabrics are then each time immersed in said soaking liquor. The soaking periods for the soaking liquors comprising any of the soaking compositions 1 to 12 are typically from 1 minute to 24 hours.

Finally, the fabrics are removed from the soaking liquors, rinsed with water and washed with a regular washing process, handwash or washing machine wash, with a regular detergent, with or without re-using the soaking liquor, then said fabrics are left to dry. Excellent stain removal performance is obtained with these compositions on various stains including greasy stains and/or enzymatic stains and/or bleachable stains and the like.

Example of Process for Manufacturing the Dry Effervescent Granules According to the Present Invention The following process may be carried out to form a dry effervescent granule consisting of 40% by weight of the total granule of bicarbonate, 40% by weight of malic acid, 16% by weight of carbonate, and 4% by weight of citric acid. In a first step the respective ingredients are mixed together at the respective levels. Then the obtained mixture is incorporated in a Pharmapaktor L200/50P® commercially available from Hosokawa Bepex GmbH. The distance between the rolls is about 5 cm, the pressing force applied during the compaction step is about 60 kN, the roll speed is about 15 rpm and the feed screw is about 14 rpm. In the Pharmapaktor L200/50P® the mixture is forced between the compaction rolls so as to form a compacted flake/sheet. This compacted sheet/flake is then milled with a Flake Crusher FC 200® with a mesh size of 1.2 mm. A bar-head is installed on the Flake Crusher FC 200®. The process temperature is at about 25° C. The resulting granules are then incorporated in a granular composition according to the present invention (e.g. compositions 4 to 6 above).

II) Laundry Washing Machine Detergent Compositions

In the detergent compositions, the abbreviated component identifications have the following meanings:

| | |
|---|---|
| LAS | Sodium linear $C_{12}$ alkyl benzene sulfonate |
| TAS | Sodium tallow alkyl sulfate |
| C45AS | Sodium $C_{14}$–$C_{15}$ linear alkyl sulfate |
| MES | α-sulpho methylester of $C_{18}$ fatty acid |
| CxyEzS | Sodium $C_{1x}$–$C_{1y}$ branched alkyl sulfate condensed with z moles of ethylene oxide |
| $MBAS_{x,y}$ | Sodium mid-chain branched alkyl sulfate having an average of x carbon atoms, whereof an average of y carbons comprised in (a) branching unit(s) |
| $C_{48}$ SAS | Sodium $C_{14}$–$C_{18}$ secondary alcohol sulfate |
| SADExS | Sodium $C_{14}$–$C_{22}$ alkyl disulfate of formula 2-(R).$C_4$$H_7$-1,4-$(SO_4\text{-})_2$ where R = $C_{10}OC_{18}$, condensed with z moles of ethylene oxide |
| CxyEz | A $C_{1x-1y}$ branched primary alcohol condensed with an average of z moles of ethylene oxide |
| QAS I | $R_2.N^+(CH_3)_2(C_2H_4OH)$ with $R_2$ = 50%–60% $C_9$; 40%–50% $C_{11}$ |
| QAS II | $R_1.N^+(CH_3)(C_2H_4OH)_2$ with $R_1$ = $C_{12}$–$C_{14}$ |
| Soap | Sodium linear alkyl carboxylate derived from an 80/20 mixture of tallow and coconut oils. |
| TFAA I | $C_{12}$–$C_{14}$ alkyl N-methyl glucamide |
| TFAA II | $C_{16}$–$C_{18}$ alkyl N-methyl glucamide |
| TPKFA | $C_{12}$–$C_{14}$ topped whole cut fatty acids |
| STPP | Anhydrous sodium tripolyphosphate |
| Zeolite A I | Hydrated Sodium Aluminosilicate of formula $Na_{12}(A1O_2SiO_2)_{12}.27H_2O$ having a primary particle size in the range from 0.1 to 10 micrometers |
| Zeolite A II | overdried Zeolite A I |
| NaSKS-6 | Crystalline layered silicate of formula δ-$Na_2Si_2O_5$ |
| Citric acid I | Anhydrous citric acid |
| Citric acid II | Citric acid monohydrate |
| Malic acid | Anhydrous malic acid |
| Maleic acid | Anhydrous maleic acid |
| Tartaric acid | Anhydrous aspartic acid |
| Carbonate I | Anhydrous sodium carbonate with an average particle size between 200 μm and 900 μm |
| Carbonate II | Anhydrous sodium carbonate with an average particle size between 100 μm and 200 μm |
| Bicarbonate | Anhydrous sodium bicarbonate with a particle size distribution between 400 μm and 1200 μm |
| Silicate | Amorphous Sodium Silicate ($SiO_2:Na_2O$; 2.0 ratio) |
| Sodium sulfate | Anhydrous sodium sulfate |
| Citrate | Tri-sodium citrate dihydrate of activity 86.4% with a particle size distribution between 425 μm and q 850 μm |
| MA/AA | Copolymer of 1:4 maleic/acrylic acid, average molecular weight about 70,000 |
| CMC | Sodium carboxymethyl cellulose |
| Protease | Proteolytic enzyme of activity 4KNPU/g sold by NOVO Industries A/S under the tradename Savinase |
| Alcalase | Proteolytic enzyme of activity 3 AU/g sold by NOVO Industries A/S |
| Cellulase | Cellulytic enzyme of activity 1000 CEVU/g sold by NOVO Industries A/S under the tradename Carezyme |
| Amylase | Amylolytic enzyme of activity 60KNU/g sold by NOVO Industries A/S under the tradename Termamyl 60T |
| Lipase | Lipolytic enzyme of activity 100kU/g sold by NOVO Industries A/S under the tradename Lipolase |
| Endolase | Endoglunase enzyme of activity 3000 CEVU/g sold by NOVO Industries A/S |
| PB4 | Sodium perborate tetrahydrate of nominal formula $NaBO_2.3H_2O.H_2O_2$ |
| PB1 | Anhydrous sodium perborate bleach of nominal formula $NaBO_2.H_2O_2$ |
| Percarbonate | Sodium Percarbonate of nominal formula 2NaCO3.3H2O2 |
| NAC-OBS | (Nonanamido caproyl) oxybenzene sulfonate in the form of the sodium salt. |
| NOBS | Nonanoyl oxybenzene sulfonate in the form of the sodium salt |
| DPDA | Diperoxydodecanedioic acid |
| PAP | N-phthaloylamidoperoxicaproic acid |
| NAPAA | Nonanoylamido peroxo-adipic acid |
| NACA | 6 nonylamino-6 oxo-caproic acid. |
| TAED | Tetraacetylethylenediamine |

| | |
|---|---|
| DTPMP | Diethylene triamine penta (methylene phosphonate), marketed by Monsanto under the Trade name Dequest 2060 |
| Photoactivated Brightener 1 | Sulfonated Zinc or aluminium Phthlocyanine encapsulated Disodium 4,4'-bis(2-sulphostyryl)biphenyl |
| Brightener 2 | Disodium 4,4'-bis(4-anilino-6-morpholino-1.3.5-triazin-2-yl)amino)stilbene-2:2'-disulfonate. |
| HEDP | 1,1-hydroxyethane diphosphonic acid |
| PVNO | Polyvinylpyridine N-oxide |
| PVPVI | Copolymer of polyvinylpyrolidone and vinylimidazole |
| QEA | bis $((C_2H_5O)(C_2H_4O)_n)(CH_3)$-$N^+$-$C_6H_{12}$-$N^+$-$(CH_3)$bis$((C_2H_5O)$-$(C_2H_4O)_n)$, wherein n = from 20 to 30 |
| SRP 1 | Sulfobenzoyl end capped esters with oxyethylene oxy and terephtaloyl backbone |
| SRP 2 | Diethoxylated poly(1,2 propylene terephtalate) short block polymer |
| Silicone antifoam | Polydimethylsiloxane foam controller with siloxane-oxyalkylene copolymer as dispersing agent with a ratio of said foam controller to said dispersing agent of 10:1 to 100:1. |

In the following examples all levels are quoted as % by weight of the composition:

The following high density granular laundry detergent compositions A to F of particular utility under European machine wash conditions were prepared in accord with the invention:

| | A | B | C | D | E | F |
|---|---|---|---|---|---|---|
| LAS | 8.0 | 8.0 | 8.0 | 8.0 | 8.0 | 8.0 |
| C25E3 | 3.4 | 3.4 | 3.4 | 3.4 | 3.4 | 3.4 |
| C46AS | 1.0 | 2.0 | 2.5 | — | 3.0 | 4.0 |
| C68AS | 3.0 | 2.0 | 5.0 | 7.0 | 1.0 | 0.5 |
| QAS I | — | — | 0.8 | — | — | 0.8 |
| Zeolite A | 18.1 | 18.1 | 16.1 | 18.1 | 18.1 | 18.1 |
| Zeolite MAP | — | 4.0 | 3.5 | — | — | — |
| Carbonate I | 12.0 | 12.0 | 11.5 | 25.0 | 25.0 | 25.0 |
| Silicate | 1.4 | 1.4 | 1.4 | 3.0 | 3.0 | 3.0 |
| MA/AA | 0.3 | 0.3 | 0.3 | 0.3 | 0.3 | 0.3 |
| CMC | 0.2 | 0.2 | 0.2 | 0.2 | 0.2 | 0.2 |
| PB4 | 9.0 | 9.0 | 9.0 | 9.0 | 9.0 | 9.0 |
| TAED | 1.5 | 1.5 | 1.0 | 1.5 | — | 1.5 |
| Mn Catalyst | — | 0.03 | 0.07 | — | — | — |
| DTPMP | 0.25 | 0.25 | 0.25 | 0.25 | 0.25 | 0.25 |
| HEDP | 0.3 | 0.3 | 0.2 | 0.2 | 0.3 | 0.3 |
| EDDS | — | — | 0.4 | 0.2 | — | — |
| QEA 1 | 1.0 | 0.8 | 0.7 | 1.2 | — | 0.5 |
| Protease | 0.26 | 0.26 | 0.26 | 0.26 | 0.26 | 0.26 |
| Amylase | 0.1 | 0.1 | 0.4 | 0.3 | 0.1 | 0.1 |
| Lipase | 0.05 | 0.6 | 0.7 | 0.1 | 0.07 | 0.1 |
| Photoactivated bleach (ppm) | 15 ppm | 15 ppm | 15 ppm | 15 ppm | 15 ppm | 15 ppm |
| Brightener 1 | 0.09 | 0.09 | 0.09 | 0.09 | 0.09 | 0.09 |
| Perfume | 0.3 | 0.3 | 0.3 | 0.3 | 0.3 | 0.3 |
| Dry Effervescent granule (malic acid 44%, sodium bicarbonate 40%, sodium carbonate II, 10%, LAS 6%) | 10 | 10 | 15 | 15 | 20 | 20 |
| Silicone antifoam | 0.5 | 0.5 | 0.5 | 0.5 | 0.5 | 0.5 |
| Minors/inerts to 100% | | | | | | |

The following granular laundry detergent compositions G to I of particular utility under European machine wash conditions were prepared in accord with the invention:

| | G | H | I |
|---|---|---|---|
| LAS | 5.25 | 5.61 | 4.76 |
| TAS | 1.25 | 1.86 | 1.57 |
| C45AS | — | 2.24 | 3.89 |
| C25E3S | — | 0.76 | 1.18 |
| C45E7 | 3.25 | — | 5.0 |
| C25E3 | — | 5.5 | — |
| QAS | 0.8 | 2.0 | 2.0 |
| STPP | 19.7 | — | — |
| Zeolite A | — | 19.5 | 19.5 |
| Zeolite MAP | 2.0 | — | — |
| NaSKS-6/citric acid (79:21) | — | 10.6 | 10.6 |
| Carbonate I | 4.7 | 19.3 | 18.6 |
| Silicate | 6.8 | — | — |
| MA/AA | 0.8 | 1.6 | 1.6 |
| CMC | 0.2 | 0.4 | 0.4 |
| PB4 | 5.0 | 12.7 | — |
| Percarbonate | 5.0 | — | 12.7 |
| TAED | 0.5 | 3.1 | — |
| Mn Catalyst | 0.04 | — | — |
| DTPMP | 0.25 | 0.2 | 0.2 |
| HEDP | — | 0.3 | 0.3 |
| QEA 1 | 0.9 | 1.2 | — |
| Protease | 0.26 | 0.85 | 0.85 |
| Lipase | 0.15 | 0.25 | 0.15 |
| Cellulase | 0.28 | 0.28 | 0.28 |
| Amylase | 0.4 | 0.1 | 0.1 |
| PVP | 0.9 | 1.3 | 0.8 |
| Photoactivated bleach (ppm) | 15 ppm | 27 ppm | 27 ppm |
| Brightener 1 | 0.08 | 0.19 | 0.19 |
| Brightener 2 | — | 0.04 | 0.04 |
| Perfume | 0.3 | 0.3 | 0.3 |
| Dry Fffervescent granules (malic acid 40%, citric acid 6%, sodium bicarbonate 40%, sodium carbonate 14%) | 10 | 15 | 5 |
| Silicone antifoam | 0.5 | 2.4 | 2.4 |
| Minors/inerts to 100% | | | |

The following are high density and bleach-containing detergent formulations according to the present invention:

| | J | K | L |
|---|---|---|---|
| Blown Powder | | | |
| Zeolite A | 5.0 | 5.0 | 15.0 |
| Sodium sulfate | 0.0 | 5.0 | 0.0 |
| LAS | — | 5.0 | 3.0 |
| C45AS | 3.0 | 2.0 | 4.0 |
| QAS II | — | — | 1.5 |
| DTPMP | 0.4 | 0.4 | 0.4 |
| CMC | 0.4 | 0.4 | 0.4 |
| MA/AA | 4.0 | 2.0 | 2.0 |
| Dry Effervescent granules (maleic acid 30%, sodium bicarbonate 40%, sodium carbonate I 14%, PEG) | 20.0 | 5.0 | |
| Dry add | | | |
| Dry Effervescent granules (maleic acid 30%, sodium bicarbonate 40%, sodium carbonate II 14%, PEG 16%) | — | 5.0 | — |
| Dry Effervescent granules (tartaric acid 30%, sodium bicarbonate 40%, sodium carbonate I 14%, TAE50 16%) | — | — | 5.0 |
| Spray On (on particles) | | | |
| Encapsulated Perfume | 0.3 | 0.3 | 0.3 |
| C25E3 | — | — | 2.0 |
| Dry additives | | | |
| QEA | — | — | 0.5 |

-continued

|  | J | K | L |
|---|---|---|---|
| Citrate | 3.0 | — | 2.0 |
| Bicarbonate | — | 3.0 | — |
| Carbonate | 8.0 | 10.0 | 5.0 |
| NAC OBS | 6.0 | — | — |
| Manganese catalyst | — | — | 0.3 |
| NOBS | — | 2.0 | — |
| PB1 or Percarbonate | 14.0 | 7.0 | — |
| Polyethylene oxide of MW 5,000,000 | — | — | 0.2 |
| Bentonite clay | — | — | 10.0 |
| Citric acid II | — | — | 1.5 |
| Protease | 1.0 | 1.0 | 1.0 |
| Lipase | 0.4 | 0.4 | 0.4 |
| Amylase | 0.6 | 0.6 | 0.6 |
| Cellulase | 0.6 | 0.6 | 0.6 |
| Silicone antifoam | 5.0 | 5.0 | 5.0 |
| Dry additives |  |  |  |
| Sodium sulfate | 0.0 | 3.0 | 0.0 |
| Balance | 100.0 | 100.0 | 100.0 |
| (Moisture and Miscellaneous) |  |  |  |
| Density (g/liter) | 850 | 850 | 850 |

The following are detergent formulations according to the present invention:

|  | M | N |
|---|---|---|
| Dry Effervescent granules | 10.0 | — |
| (maleic acid 30%, sodium |  |  |
| bicarbonate 40%, sodium |  |  |
| carbonate I 14%, PEG) |  |  |
| Dry Effervescent granules | — | 4.0 |
| (malic acid 40% |  |  |
| sodium bicarbonate 40%, |  |  |
| sodium carbonate II 20%) |  |  |
| Spray-on on dry effervescence particle |  |  |
| C25E3 | 1.0 | 4.0 |
| Perfume | 0.5 | 0.5 |
| Dry Adds |  |  |
| HEDP | 0.5 | 0.3 |
| SKS 6 | 13.0 | 10.0 |
| Citrate/citric acid I | — | 2.0 |
| Malic acid | 2.0 | — |
| NAC OBS | 4.1 | — |
| TAED | 0.8 | — |
| Percarbonate | 20.0 | 5.0 |
| SRP 1 | 0.3 | 0.3 |
| Protease | 1.4 | 1.4 |
| Lipase | 0.4 | 0.4 |
| Cellulase | 0.6 | 0.6 |
| Amylase | 0.6 | 0.6 |
| QEA | 1.0 | — |
| Silicone antifoam | 5.0 | 5.0 |
| Brightener 1 | 0.2 | 0.2 |
| Brightener 2 | 0.2 | — |
| Density (g/liter) | 850 | 850 |

The following are high density detergent formulations according to the present invention:

|  | O | P | R |
|---|---|---|---|
| Agglomerate |  |  |  |
| C45AS | 11.0 | 14.0 | 5.0 |
| QAS I | 1.8 | 2.2 | — |
| Zeolite A | 15.0 | 6.0 | 15.0 |
| Carbonate | 4.0 | 8.0 | 5.0 |
| AE5 | — | — | 5.0 |
| TFAA II | — | — | 5.0 |
| MA/AA | 4.0 | 2.0 | 2.0 |
| CMC | 0.5 | 0.5 | 0.5 |
| DTPMP | 0.4 | 0.4 | 0.4 |
| Dry Effervescent granules | 3.0 | — | 7.0 |
| (malic acid 20%, sodium bicarbonate 20%, |  |  |  |
| sodium carbonate II 20%, TAE50 10% |  |  |  |
| TFAA II 30%) |  |  |  |
| Spray On |  |  |  |
| C25E3 | 1.0 | 4.0 | 4.0 |
| C25E7 | 5.0 | — | — |
| Perfume | 0.5 | 0.5 | 0.5 |
| Dry Adds |  |  |  |
| HEDP | 0.5 | 0.3 | 0.3 |
| SKS 6 | 13.0 | 10.0 | 10.0 |
| Citrate | — | 1.0 | 1.0 |
| Citric acid II | 2.0 | — | — |
| NAC OBS | 4.1 | 6.2 | 6.2 |
| TAED | 0.8 | 1.0 | 1.0 |
| Percarbonate | 20.0 | 20.0 | 20.0 |
| SRP 1 | 0.3 | 0.3 | 0.3 |
| Protease | 1.4 | 1.4 | 1.4 |
| Lipase | 0.4 | 0.4 | 0.4 |
| Cellulase | 0.6 | 0.6 | 0.6 |
| Amylase | 0.6 | 0.6 | 0.6 |
| QEA | 1.0 | — | — |
| Silicone antifoam | 5.0 | 5.0 | 5.0 |
| Brightener 1 | 0.2 | 0.2 | 0.2 |
| Brightener 2 | 0.2 | — | — |
| Dry Effervescent granules | 2.0 | 10.0 | — |
| (maleic acid 30% |  |  |  |
| sodium bicarbonate 30%, |  |  |  |
| sodium carbonate I 10%,) |  |  |  |
| Density (g/liter) | 850 | 850 | 850 |

What is claimed is:

1. A granular detergent composition comprising at least one detergent active ingredient and from 3% to 25% by weight of a dry effervescent granule, wherein the dry effervescent granule comprises an acid wherein the acid is a mono or polycarboxylic acid selected from the group consisting of citric acid, adipic acid, glutaric acid, 3 chetoglutaric acid, citramalic acid, maleic acid, fumaric acid, malic acid, succinic acid and malonic acid in their acidic forms, their mono-, di-, tri-salts form, their anhydrous and in their hydrated forms and mixtures thereof, a carbonate source selected from the group consisting of carbonate and bicarbonate, and a binder selected from the group consisting of cellulose derivatives, homo- and co-polymeric polycarboxylic acid and their salts, $C_6$–$C_{20}$ alkyl and alkylaryl sulphonates and sulphates, polyvinylpyrrolidones with an average molecular weight of from about 12,000 to about 700,000, copolymers of maleic anhydride with ethylene, methylvinyl ether, methacrylic acid or acrylic acid, $C_{10}$–$C_{20}$ mono and diglycerol ethers, and mixtures thereof, wherein said acid, carbonate source and binder are in close physical proximity and further wherein said dry effervescent granule is obtained by pressure agglomeration of said acid, carbonate source and binder, characterized in that the granular detergent composition has an Effervescence Index (EI) of at least 10, the Effervescence Index (EI) being $$EI = \frac{(L \times S \times 100)}{M} \times (NC_{inter} + NC_{intra})$$

wherein L is the number of acidic groups of the acid having a pKa of less than or equal to 6, S is (solubility in water of the acid in g/liter, at 25° C.)$^{1/3}$, M is the molecular weight of the acid, $NC_{inter}$ is the density of contact points between the carbonate source and acid which are separately present in the composition per mm$^3$, and $NC_{intra}$ is the weight fraction of the acid in said dry effervescent granule x the weight fraction of the carbonate source in said dry effervescent granule×12.

2. A granular detergent composition according to claim 1 wherein the dry effervescent granules have a diameter size of from 0.001 to 7 mm.

3. A granular detergent composition according to claim 1 wherein the dry effervescent granules have a bulk density of from 500 g/l to 1200 g/l.

4. A granular detergent composition according to claim 1 which comprises from 0.1% to 99% by weight of the total dry effervescent granule of the acid or a mixture thereof, with the proviso that when citric acid is present its level is below 20% by weight of the total dry effervescent granule.

5. A granular detergent composition according to claim 1 which comprises from 0.1% to 99% by weight of the total dry effervescent granule of carbonate and/or bicarbonate.

6. A granular detergent composition according to claim 1 which comprises up to 50% by weight of the total dry effervescent granule of a binder or a mixture thereof.

7. A granular detergent composition according to claim 1 which comprises an oxygen bleach, up to a level of 80% by weight of the total composition, bleach activator, up to a level of 30% by weight of the total composition.

8. A granular detergent composition according to claim 1 which comprises at least a surfactant comprising a nonionic surfactant or a mixture thereof up to a level of 50% by weight of the total composition.

9. A granular detergent composition according to claim 1 comprising the dry effervescent granule and a dry-added acid, selected from the group consisting of citric acid and malic acid and a dry-added carbonate source.

10. A granular detergent composition according to claim 1 in the form of an extrudate or a tablet.

11. A process for manufacturing a dry effervescent granule according to claim 1 wherein said process comprises the steps of:

first mixing the acid, the carbonate source and the binder to form a mixture, then submitting the mixture to a pressure agglomeration step to form an agglomerate mixture, and finally granulation of the agglomerate mixture in a granulation step.

12. A process according to claim 11 wherein the bulk density of the dry effervescent granule having undergone said pressure agglomeration step is increased up to 200 g/l as compared to the bulk density of the resulting mixture comprising the acid and bicarbonate and/or carbonate, and the binder, before having undergone said pressure agglomeration step.

13. A process according to claims 11, or wherein said pressure agglomeration step is a roller compaction step wherein the resulting mixture is forced between compaction rolls under pressure, whereafter the compacted mixture is granulated into dry effervescent granules and optionally sieved.

14. A process of soaking fabrics, wherein said fabrics are immersed in a soaking liquor comprising water and an effective amount of a granular detergent composition according to claim 1, for an effective period of time, then removed from said soaking liquor.

* * * * *